United States Patent
Yamada et al.

(10) Patent No.: US 7,759,885 B2
(45) Date of Patent: Jul. 20, 2010

(54) MOTOR DRIVE DEVICE AND CONTROL METHOD THEREOF

(75) Inventors: Kenji Yamada, Toyota (JP); Shunsuke Oyama, Nishikamo-gun (JP); Kenji Itagaki, Okazaki (JP); Shinichi Sugai, Toyota (JP); Kiyoe Ochiai, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 255 days.

(21) Appl. No.: 12/085,181

(22) PCT Filed: Dec. 4, 2006

(86) PCT No.: PCT/JP2006/324612
§ 371 (c)(1),
(2), (4) Date: May 19, 2008

(87) PCT Pub. No.: WO2007/086200
PCT Pub. Date: Aug. 2, 2007

(65) Prior Publication Data
US 2009/0160380 A1 Jun. 25, 2009

(30) Foreign Application Priority Data
Jan. 27, 2006 (JP) .............................. 2006-019320

(51) Int. Cl.
*H02P 6/10* (2006.01)
*H02P 27/00* (2006.01)

(52) U.S. Cl. ............................ 318/400.15; 318/400.02; 318/400.21; 318/432; 318/609; 318/615; 701/22; 701/51; 701/53

(58) Field of Classification Search ............ 318/400.15, 318/400.02, 400.21, 432, 609, 610; 701/22, 701/51, 52
See application file for complete search history.

(56) References Cited

U.S. PATENT DOCUMENTS

| | | | | |
|---|---|---|---|---|
| 3,887,853 | A | * | 6/1975 | Klein et al. ................. 318/801 |
| 3,919,609 | A | | 11/1975 | Klautschek et al. |
| 4,137,489 | A | | 1/1979 | Lipo |
| 4,267,496 | A | * | 5/1981 | Ivanov et al. ............... 318/615 |

(Continued)

FOREIGN PATENT DOCUMENTS

EP  1 551 098 A1  7/2005

(Continued)

*Primary Examiner*—Paul Ip
(74) *Attorney, Agent, or Firm*—Oliff & Berridge, PLC

(57) ABSTRACT

A torque command (Tht) used in the calculation of a voltage command (Vht) of a voltage-up converter is generated by adding an upper limit value (Tc_max) of damping control that can be set by a motor drive device with a target drive torque (Tbt). Accordingly, the torque command (Tht) exhibits a waveform absent of variation, differing from a torque command (Tcmd) that is generated by adding damping torque generated based on revolution count variation component with the target drive torque (Tbt). Therefore, the voltage command (Vht) calculated based on the torque command (Tht) exhibits a waveform absent of variation. Accordingly, increase in current passing through the voltage-up converter caused by variation in the voltage command (Vht) can be suppressed. As a result, power loss at the voltage-up converter is reduced and operation of the motor at high efficiency can be realized. Further, the voltage-up converter can be protected from element fracture.

27 Claims, 15 Drawing Sheets

U.S. PATENT DOCUMENTS

| | | | | |
|---|---|---|---|---|
| 4,395,904 | A * | 8/1983 | Ivanov et al. | 73/115.01 |
| 4,633,157 | A * | 12/1986 | Streater | 318/723 |
| 5,534,764 | A | 7/1996 | Masaki et al. | |
| 5,883,484 | A | 3/1999 | Akao | |
| 6,193,628 | B1 * | 2/2001 | Hrovat et al. | 477/3 |
| 7,110,867 | B2 * | 9/2006 | Imazu | 701/22 |
| 7,315,774 | B2 * | 1/2008 | Morris | 701/53 |
| 7,414,425 | B2 * | 8/2008 | O'Gorman et al. | 324/772 |
| 7,423,411 | B2 * | 9/2008 | Sihler | 322/19 |
| 7,577,507 | B2 * | 8/2009 | Morris | 701/51 |
| 2003/0062859 | A1 | 4/2003 | Amann et al. | |
| 2005/0038576 | A1 | 2/2005 | Hara et al. | |
| 2005/0167170 | A1 * | 8/2005 | Hisada et al. | 180/65.2 |
| 2005/0247503 | A1 * | 11/2005 | Imazu | 180/300 |
| 2005/0248361 | A1 * | 11/2005 | O'Gorman et al. | 324/772 |
| 2006/0125437 | A1 | 6/2006 | Kitano | |
| 2007/0096672 | A1 * | 5/2007 | Endo et al. | 318/432 |
| 2007/0225886 | A1 * | 9/2007 | Morris | 701/51 |
| 2007/0225887 | A1 * | 9/2007 | Morris | 701/51 |
| 2007/0225888 | A1 * | 9/2007 | Morris | 701/51 |
| 2007/0225889 | A1 * | 9/2007 | Morris | 701/53 |
| 2007/0279012 | A1 * | 12/2007 | Sihler | 322/20 |
| 2007/0291518 | A1 * | 12/2007 | Eckardt | 363/41 |

FOREIGN PATENT DOCUMENTS

| | | |
|---|---|---|
| JP | A 10-66383 | 3/1998 |
| JP | A 2005-198402 | 7/2005 |

* cited by examiner

| DAMPING TORQUE INDEX Kc | VEHICLE STATE |
|---|---|
| 0 | EXTREMELY LOW VEHICLE SPEED |
| 1 | LOW SPEED, MIDDLE SPEED, HIGH SPEED |
| 2 | ENGINE STARTUP・ENGINE STOP |
| 3 | TARGET DRIVE TORQUE SUDDEN CHANGE・ACCELERATOR POSITION SUDDEN CHANGE |
| 4 | OTHER THAN 0-3 ABOVE (RUNNING ROAD STATE, AND THE LIKE) |

| DAMPING TORQUE INDEX Kc | DAMPING TORQUE Tcct [Nm] |
|---|---|
| 0 | 20 |
| 1 | 10 |
| 2 | 40 |
| 3 | 20 |
| 4 | x |

MOTOR DRIVE DEVICE AND CONTROL METHOD THEREOF

TECHNICAL FIELD

The present invention relates to a motor drive device and a control method thereof. Particularly, the present invention relates to a motor drive device with a damping control function of output torque, and a method of controlling the motor drive device.

BACKGROUND ART

Recently, attention is focused on hybrid vehicles and electric vehicles as vehicles taking into account environmental issues. A hybrid vehicle includes, in addition to a conventional engine, a DC (direct current) power source, an inverter, and a motor driven by the inverter as the power source. In addition to achieving the power source by driving the engine, the DC voltage from the DC power source is converted into AC (alternating current) voltage by the inverter, and the converted AC voltage is used to rotate the motor to achieve power.

An electric vehicle includes a DC power source, an inverter, and a motor driven by the inverter as the power source.

A motor drive device incorporated in such a hybrid vehicle or electric vehicle employs the damping control technique to suppress vehicle vibration caused by deviation in torque control by accurately matching the output torque of the motor with the torque command (for example, refer to Japanese Patent Laying-Open No. 2005-198402). According to this publication, the torque command applied to the motor drive device is an addition of damping torque that is generated based on the waviness component of the motor revolutions or the like with the output torque primarily required of the motor. By controlling the motor drive with the added result as the eventual torque command, the pulsation component of the torque is canceled out. As a result, vehicle vibration can be suppressed.

In order to drive the motor at high efficiency, some types of hybrid vehicles are configured to allow adjustment of the applied voltage for motor drive (hereinafter, also referred to as "motor drive voltage") according to the motor operating state (the number of revolutions, torque, and the like) by incorporating a level conversion function of DC voltage applied to the motor drive device that controls the motor drive. Particularly, by incorporating a booster function to increase the motor drive voltage higher than the input DC voltage, the battery qualified as a DC voltage source can be reduced in size. Further, power loss in association with the increased voltage can be reduced to allow higher efficiency of the motor.

Japanese Patent Laying-Open No. 10-066383, for example, discloses a configuration in which the motor for vehicle running is controlled. The DC voltages from a battery is boosted by a voltage-up converter to generate a motor drive voltage, which is converted into AC voltage by the inverter to be used for motor drive control. In accordance with this configuration, the target value of the motor drive voltage, i.e. the voltage command of the voltage-up converter, is determined based on the motor revolution and the torque command.

Consider the case where a torque command is used to determine the voltage command of the voltage-up converter during execution of damping control set forth above. The torque command in damping control corresponds to the primarily required torque added with the damping torque, and has a varying waveform reflecting the waviness component of the number of revolutions. Therefore, the voltage command determined based on such a torque command will vary, likewise the torque command. Such variation in voltage command will cause the voltage-up converter to frequently repeat a voltage-up operation and a voltage-down operation. As a result, the power loss occurring at the voltage-up converter increases to degrade the system efficiency of the motor drive device.

In accordance with the configuration set forth above in Japanese Patent Laying-Open No. 10-066383, a smoothing capacitor must be provided at the output side of the voltage-up converter to stabilize the motor drive voltage. Therefore, variation in the voltage command will cause a change in the holding voltage of the smoothing capacitor, such that the stored power will also vary. If a voltage-up operation and voltage-down operation are frequently repeated according to variation in the voltage command, the voltage-up converter is subject to variation of the stored power of the smoothing capacitor in addition to the consumed/generated power of AC motor M1. As a result, a relatively large current will flow through the voltage-up converter. If this current becomes excessive, the switching element constituting the voltage-up converter may be damaged. Further, increase of the current flowing through the voltage-up converter will increase power loss, and may become the cause of preventing high efficiency of the motor.

DISCLOSURE OF THE INVENTION

In view of the foregoing, an object of the present invention is to provide a motor drive device that can execute damping control without increasing the current flowing through a voltage-up converter, and a control method of the motor drive device.

According to an aspect of the present invention, a motor drive device includes a drive circuit driving a motor, a motor drive control circuit controlling the drive circuit such that output torque of the motor follows a first torque command, a voltage converter for voltage conversion of power from a power source for input to the drive circuit, and a voltage conversion control circuit controlling voltage conversion such that an output voltage matches a voltage command. The motor drive control circuit includes a first damping control unit generating damping torque to suppress pulsation of the output torque of the motor with predetermined torque set in advance as an upper limit value, and adding the generated damping torque to target drive torque as the first torque command. The voltage conversion control circuit determines the voltage command based on an upper limit value of the damping torque to control the voltage conversion according to the voltage command.

Since the torque command employed in the determination of the voltage command at the voltage conversion control unit is set based on damping torque fixed at the upper limit value of the damping torque in the motor drive device set forth above, variation in the voltage command reflecting the damping torque can be suppressed. Accordingly, increase of the current flowing through the voltage converter can be suppressed to allow reduction in power loss. Further, since the voltage command constantly meets the motor drive voltage required to output the torque specified by the first torque command, damping control can be conducted stably.

Preferably, the motor drive device further includes a charge storage unit arranged between the voltage converter and the drive circuit to smooth the converted DC voltage for input to the drive circuit.

By the motor drive device set forth above, the current passing through the voltage converter can be prevented from increasing since variation in the stored power at the charge storage unit can be suppressed.

Preferably, the voltage conversion control circuit includes a second damping control unit adding the upper limit value of the damping torque to the target drive torque as a second torque command, and a voltage conversion control unit determining the voltage command according to the second torque command and a revolution count of the motor to control voltage conversion based on the voltage command. The second damping control unit sets the upper limit value of the damping torque such that it becomes lower as the revolution count of the motor becomes higher.

By setting the upper limit value of the damping torque variable according to the revolution count of the motor in the motor drive device set forth above, the voltage command in a high motor revolution mode is set to a relatively low voltage than when the upper limit value of the damping torque is fixed. Accordingly, increase of the current passing through the voltage converter can be suppressed to allow protection of the voltage converter and reduction in power loss. Further, the power source can be protected from charge and discharge caused by excessive power since the input/output limit of the power source can be held in abidance even in the high motor revolution region.

Preferably, the second damping control unit includes a damping control instruction unit instructing one of execution and suspension of damping control according to a temporal rate of change of the target drive torque and the revolution count of the motor. The second damping control unit takes the target drive torque directly as the second torque command in response to a suspension instruction of damping control.

By the configuration of not adding the damping torque to the target drive torque during the period when damping control is not effective in the motor drive device set forth above, a voltage-up operation by a voltage command uselessly high during the aforementioned period can be prevented from being conducted, as compared to the case where the upper limit value of the damping torque is always added. Since power loss of the voltage converter is reduced thereby, the motor drive efficiency can be further improved.

Preferably, the damping control instruction unit instructs only execution of damping control when the input/output power limit value of the power source is lower than a predetermined threshold value.

By the motor drive device set forth above, voltage surge that may occur at the power source at the switching timing between execution and suspension of damping control can be prevented.

Preferably, the motor drive device further includes a power source temperature detection unit detecting the temperature of the power source. The damping control instruction unit determines that the input/output power limit value of the power source is lower than the predetermined threshold value when the detected temperature of the power source is lower than a predetermined temperature.

By continuing execution of damping control when the power source is at low temperature in accordance with the motor drive device set forth above, occurrence of voltage surge at the power source can be readily prevented.

According to another aspect of the present invention, a motor drive device includes a drive circuit driving a motor that generates drive torque of a vehicle, a motor drive control circuit controlling the drive circuit such that output torque of the motor follows a first torque command, a voltage converter for voltage conversion of power from a power source for input to the drive circuit, and a voltage conversion control circuit controlling voltage conversion such that an output voltage matches a voltage command. The motor drive control circuit includes a first damping control unit generating damping torque to suppress pulsation of the output torque of the motor with predetermined torque set in advance as an upper limit value, and adding the generated damping torque to target drive torque as the first torque command. The voltage conversion control circuit includes a second damping control unit setting a second torque command based on an upper limit value of the damping torque, and a voltage conversion control unit determining the voltage command according to the second torque command to control voltage conversion based on the voltage command. The second damping control unit sets the upper limit value of the damping torque variable according to the state of the vehicle.

By altering the upper limit value of the damping torque such that damping control is conducted adaptive to the vehicle state according to the motor drive device set forth above, the event of the voltage command being set uselessly higher than the motor drive voltage required for generation of damping torque can be avoided. Accordingly, power loss of the voltage converter and motor loss can be reduced while ensuring stable damping control. As a result, the vehicle fuel efficiency can be improved since the system efficiency of the motor drive device is improved.

Preferably, the second damping control unit sets the upper limit value of the damping torque such that it becomes lower as the vehicle speed becomes higher.

When the vehicle speed is high, the torque pulsation is relatively low and the required damping torque is also low. Therefore, by setting the damping torque to the lowest level required for damping control in accordance with the motor drive device set forth above, power loss of the voltage converter and motor loss can be reduced while suppressing vehicle vibration.

Preferably, the second damping control unit sets the upper limit value of the damping torque variable according to the temporal rate of change of the target drive torque.

Further preferably, the second damping control unit sets the upper limit value of the damping torque such that it becomes higher as the temporal rate of change of the target drive torque becomes higher.

In accordance with the motor drive device set forth above, the damping torque can be always set to a level suitable for suppressing torque pulsation since the magnitude of torque pulsation depends upon the temporal rate of change of the target drive torque. Therefore, power loss of the voltage converter and motor loss can be reduced while suppressing vehicle vibration.

Preferably, the vehicle includes an internal combustion engine generating drive torque of a vehicle by a drive source independent of the motor. The second damping control unit sets the upper limit value of the damping torque such that it becomes relatively high when the internal combustion engine is started or stopped.

By the motor drive device set forth above, damping control can be conducted effectively when the internal combustion engine is started or stopped at which time the torque pulsation is relatively large.

Preferably, the second damping control unit increases the upper limit value of the damping torque at a first rate of change set to avoid exceeding a time constant of the voltage converter in a damping torque upper limit value increase mode, and decreases the upper limit value of the damping torque by a second rate of change that is lower than the first rate of change in a damping torque upper limit value decrease mode.

By the motor drive device set forth above, insufficient torque due to the motor drive voltage not meeting the voltage command will not occur, so that the damping control response can be improved. Further, by decreasing the damping torque gently, discontinuity in the output torque due to sudden decrease in the damping torque can be prevented.

Preferably, the second damping control unit includes a damping control instruction unit instructing one of execution and suspension of damping control according to a temporal rate of change of the target drive torque and the revolution count of the motor, a feedback control unit feedback-controlling the second torque command such that a deviation between the revolution count of the motor and a target revolution count becomes zero when damping control is executed, and a feedback gain adjustment unit adjusting the gain that is to be multiplied by the deviation in feedback control according to the vehicle state, and gradually decreasing the gain towards substantially zero in response to a suspension instruction of damping control. The second damping control unit decreases the upper limit value of the damping torque at a rate of change lower than the rate of change of gain in response to a suspension instruction of damping control, and sets the upper limit value of the damping control to substantially zero in response to the gain arriving at substantially zero.

By forcing the damping torque to be set at substantially zero at the timing of substantially suspending damping control in accordance with the motor drive device set forth above, useless boosting can be prevented to further reduce power loss at the voltage converter.

According to a further aspect of the present invention, a control method of a motor drive device including a drive circuit driving a motor, and a voltage converter for voltage conversion of power from a power source for input to the drive circuit includes: a motor drive control step of controlling the drive circuit such that output torque of the motor follows a first torque command, and a voltage conversion control step of controlling voltage conversion such that an output voltage matches a voltage command. The motor drive control step includes a first damping control step of generating damping torque to suppress pulsation of output torque of the motor with predetermined torque set in advance as an upper limit value, and adding the generated damping torque to target drive torque as the first torque command. The voltage conversion control step determines the voltage command based on the upper limit value of the damping torque to control voltage conversion according to the voltage command.

Since variation in the voltage command reflecting damping torque can be suppressed by the control method of a motor drive device set forth above, increase of current passing through the voltage converter can be suppressed to reduce power loss. Further, since the voltage command always meets the motor drive voltage required to output torque specified by the first torque command, damping control can be conducted stably.

Preferably, the motor drive device further includes a charge storage unit arranged between the voltage converter and the drive circuit to smooth converted DC voltage for input to the drive circuit. The voltage conversion control step includes a second damping control step of adding the upper limit value of damping torque to target damping torque as a second torque command, and a voltage conversion control step of determining the voltage command according to the second torque command and a revolution count of the motor to control voltage conversion according to the voltage command.

The second damping control step sets the upper limit value of damping torque such that it becomes lower as the revolution count of the motor becomes higher.

According to the control method of a motor drive device set forth above, increase of current passing through the voltage converter can be suppressed to allow protection of the voltage converter and reduction in power loss. Further, the input/output limit of the power source can be held in abidance even in the high motor revolution region, allowing protection of the power source from charge and discharge caused by excessive power.

Preferably, the second damping control step includes a damping control instruction step of instructing one of execution and suspension of damping control according to a temporal rate of change of the target drive torque and revolution count of the motor. In response to a suspension instruction of damping control, the target drive torque is directly set as the second torque command.

According to the control method of a motor drive device set forth above, a boosting operation by a voltage command uselessly high during the period where damping control is not effective can be prevented. Accordingly, power loss of the voltage converter is reduced to further allow improvement in the motor driving efficiency.

Preferably, the damping control instruction step instructs only execution of damping control when an input/output power limit value of the power source is lower than a predetermined threshold value.

By the control method of a motor drive device set forth above, voltage surge that may occur at the power source at the switching timing between execution and suspension of damping control can be prevented.

Preferably, the control method further includes a power source temperature detection step of detecting the temperature of the power source. The damping control instruction step determines that the input/output power limit value of the power source is lower than a predetermined threshold value when the detected temperature of the power source is lower than a predetermined temperature.

By the control method of a motor drive device set forth above, occurrence of voltage surge at the power source can be readily prevented by continuing execution of damping control when the temperature of the power source is low.

According to still another aspect of the present invention, a control method of a motor drive device including a drive circuit driving a motor that generates drive torque of a vehicle, and a voltage converter for voltage conversion of power from a power source for input to the drive circuit includes: a motor drive control step of controlling the drive circuit such that output torque of the motor follows a first torque command, and a voltage conversion control step of controlling voltage conversion such that an output voltage matches the voltage command. The motor drive control step includes a first damping control step of generating damping torque to suppress pulsation of output torque of the motor with predetermined torque set in advance as an upper limit value, and adding the generated damping torque to a target drive torque as a first torque command. The voltage conversion control step includes a second damping control step of setting a second torque command based on the upper limit value of the damping torque, and a voltage conversion control step of determining the voltage command according to the second torque command, and controlling voltage conversion according to the voltage command. The second damping control step set the upper limit value of the damping torque variable according to the vehicle state.

According to the control method of a motor drive circuit set forth above, the event of the voltage command being set uselessly higher than the motor drive voltage required for generation of damping torque can be avoided. Accordingly, power loss of the voltage converter and motor loss can be reduced while ensuring stable damping control. As a result, the vehicle fuel efficiency can be improved since the system efficiency of the motor drive device is improved.

Preferably, the second damping control step sets the upper limit value of the damping torque such that it becomes lower as the vehicle speed becomes higher.

Therefore, by setting the damping torque to the lowest level required for damping control in accordance with the control method of a motor drive device set forth above, power loss of the voltage converter and motor loss can be reduced while suppressing vehicle vibration.

Preferably, the second damping control step sets the upper limit value of the damping torque variable according to the temporal rate of change of the target drive torque.

Further preferably, the second damping control step sets the upper limit value of the damping torque such that it becomes higher as the temporal rate of change of the target drive torque becomes higher.

By the control method of a motor drive device set forth above, the damping torque can always be set to a level suitable for suppressing torque pulsation. Accordingly, power loss of the voltage converter and motor loss can be reduced while suppressing vehicle vibration.

Preferably, the vehicle includes an internal combustion engine generating drive torque of a vehicle by a drive source independent of the motor. The second damping control step sets the upper limit value of the damping torque such that it becomes relatively high when the internal combustion engine is started or stopped.

By the control method of a motor drive device set forth above, damping control can be conducted effectively when the internal combustion engine is started or stopped at which time the torque pulsation becomes relatively larger.

Preferably, the second damping control step increases the upper limit value of the damping torque at a first rate of change set to avoid exceeding the time constant of the voltage converter when in a damping torque upper limit value increase mode, and decreases the upper limit value of the damping torque at a second rate of change that is lower than the first rate of change in a damping torque upper limit value decrease mode.

By the control method of a motor drive device set forth above, damping control response can be improved, and discontinuity in output torque caused by a sudden reduction in damping torque can be prevented.

Preferably, the second damping control step includes a damping control instruction step of instructing one of execution and suspension of damping control according to a temporal rate of change of the target drive torque and a revolution count of the motor, a feedback control step of feedback-controlling the second torque command such that a deviation between the revolution count of the motor and a target revolution count becomes zero in a damping control execution mode, and a feedback gain adjustment step of adjusting gain to be multiplied by the deviation in feedback control according to a vehicle state, and gradually decreasing the gain towards substantially zero in response to a suspension instruction of damping control. The second damping control step decreases the upper limit value of the damping torque by a rate of change lower than the rate of change of gain in response to a suspension instruction of damping control, and sets the upper limit value of damping torque to substantially zero in response to the gain arriving at substantially zero.

By the control method of a motor drive device set forth above, useless boosting of voltage is prevented to further reduce power loss at the voltage converter.

When damping control is executed according to the present invention, the torque command employed in determining the voltage command of the voltage converter is set based on the damping torque fixed at the upper limit value of the damping torque. Accordingly, increase of the current passing through the voltage converter can be suppressed since variation in the voltage command reflecting the damping torque can be suppressed.

Further, since the voltage command always meets the motor drive voltage required to output the torque specified in damping control, damping control can be conducted stably without the event of insufficient torque.

The foregoing and other objects, features, aspects and advantages of the present invention will become more apparent from the following detailed description of the present invention when taken in conjunction with the accompanying drawings.

BEST MODES FOR CARRYING OUT THE INVENTION

Figure 1:
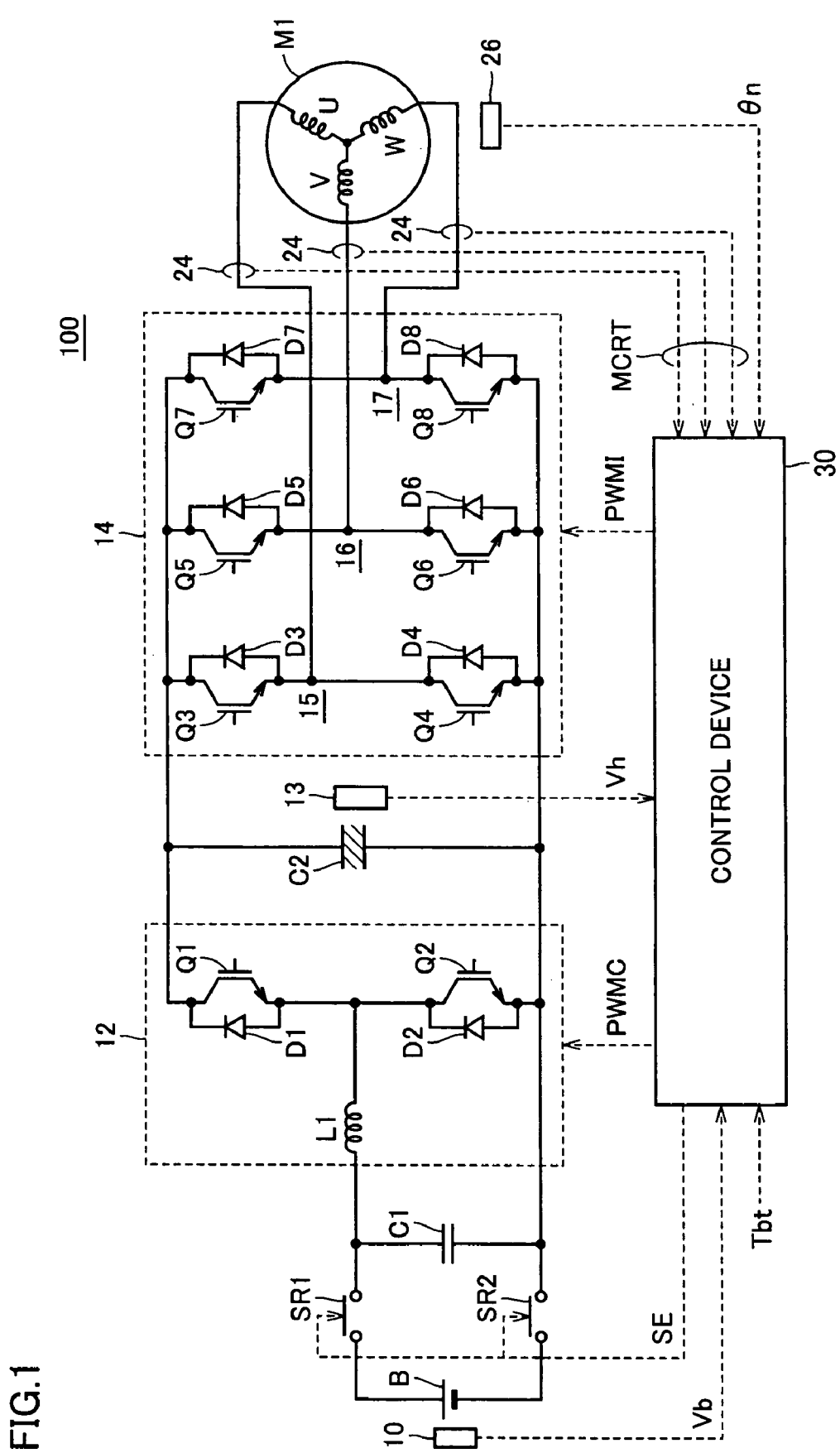
FIG. 1 is a schematic block diagram of a motor drive device according to a first embodiment of the present invention.

Embodiments of the present invention will be described hereinafter with reference to the drawings. In the drawings, the same reference characters indicate the same or corresponding elements.

First Embodiment

FIG. 1 is a schematic block diagram of a motor drive device according to a first embodiment of the present invention.

Referring to FIG. 1, a motor drive device 100 includes a DC power source B, voltage sensors 10 and 13, system relays SR1 and SR2, capacitors C1 and C2, a voltage-up converter 12, an inverter 14, a current sensor 24, a rotation position sensor 26, and a control device 30.

An AC motor M1 is a drive motor to generate torque for driving the driving wheel of a hybrid vehicle or electric vehicle. AC motor M1 is adapted to function as a power generator driven by an engine, and to operate as an electric motor for the engine to start, for example, the engine.

Voltage-up converter 12 includes a reactor L1, IGBT (Insulated Gate Bipolar Transistor) elements Q1 and Q2, and diodes D1 and D2.

Reactor L1 has one end connected to the power supply line of battery B, and the other end connected to the intermediate point between IGBT element Q1 and IGBT element Q2, i.e. between the emitter of IGBT element Q1 and the collector of IGBT element Q2.

IGBT elements Q1 and Q2 are connected in series between the power supply line and earth line. The collector of IGBT element Q1 is connected to the power supply line. The emitter of IGBT element Q2 is connected to the earth line. Further, diodes D1 and D2 conducting a current flow from the emitter side to the collector side are arranged between the collector and emitter of each of IGBT elements Q1 and Q2, respectively.

Inverter 14 includes an U-phase arm 15, a V-phase arm 16, and a W-phase arm 17. U-phase arm 15, V-phase arm 16 and W-phase arm 17 are provided in parallel between the power supply line and earth line.

U-phase arm 15 is formed of IGBT elements Q3 and Q4 connected in series. V-phase arm 16 is formed of IGBT elements Q5 and Q6 connected in series. W-phase arm 17 is formed of IGBT elements Q7 and Q8 connected in series. Further, diodes D3-D8 conducting a current flow from the emitter side to the collector side are connected between the collector and emitter of each of IGBT elements Q3-Q8, respectively.

The intermediate point of each phase arm is connected to each phase end of each phase coil in AC motor M1. In other words, AC motor M1 is a 3-phase permanent magnet motor, having one end of the three coils of the U, V, and W phases connected common to the neutral point. The U-phase coil has the other end connected to the intermediate point of IGBT elements Q3 and Q4. The V-phase coil has the other end connected to the intermediate point of IGBT elements Q5 and Q6. The W-phase coil has the other end connected to the intermediate point of IGBT elements Q7 and Q8.

The switching elements included in voltage-up converter 12 and inverter 14 are not limited to IGBT elements Q1-Q8, and may be formed of other power elements such as a MOSFET.

Battery B is a chargeable secondary battery. For example, it is a nickel-hydrogen or lithium-ion battery. As an alternative to battery B, a chargeable accumulator other than a secondary battery, such as a capacitor, may be employed. Voltage sensor 10 detects DC voltage Vb output from battery B and provides the detected DC voltage Vb to control device 30.

System relays SR1 and SR2 are turned on/off by a signal SE from control device 30.

Capacitor C1 smoothes DC voltage Vb supplied from battery B and provides the smoothed DC voltage Vb to voltage-up converter 12.

Voltage-up converter 12 boosts DC voltage Vb supplied from battery B and provides the boosted voltage to capacitor C2. Specifically, when voltage-up converter 12 receives a signal PWMC from control device 30, voltage-up converter 12 boosts DC current according to the ON period of IGBT element Q2 by signal PWMC and supplies the boosted DC voltage to capacitor C2.

Further, when voltage-up converter 12 receives signal PWMC from control device 30, DC voltage supplied from inverter 12 via capacitor C2 is lowered to charge battery B.

Capacitor C2 smoothes the DC voltage from voltage-up converter 12 and provides the smoothed DC voltage to inverter 14. Voltage sensor 13 detects the voltage across capacitor C2, i.e. output voltage Vh of voltage-up converter 12 (corresponding to the input voltage to inverter 14; the same applies hereinafter), and provides the detected output voltage Vh to control device 30.

When DC voltage is supplied from capacitor C2, inverter 14 converts the DC voltage into AC voltage based on a signal PWMI from control device 30 to drive AC motor M1. Accordingly, AC motor M1 is driven so as to generate the required torque specified by the torque command.

During regenerative braking of the hybrid vehicle or electric vehicle in which motor drive device 100 is incorporated, inverter 14 converts the AC voltage generated by AC motor M1 into DC voltage based on signal PWMI from control device 30, and provides the converted DC voltage to voltage-up converter 12 via capacitor C2.

As used herein, "regenerative braking" includes braking in association with regenerative power generation when the driver of the hybrid vehicle or electric vehicle operates the foot brake as well as reducing the vehicle speed (or ceasing acceleration) while effecting regenerative power generation by setting off the accelerator pedal during running without operating the foot brake.

Current sensor 24 detects motor current MCRT flowing to AC motor M1, and provides the detected motor current MCRT to control device 30.

Rotation position sensor 26 is attached to the rotational shaft of AC motor M1 to detect and provide to control device 30 a rotation angle θn of the rotator of AC motor M1.

Control device 30 receives the target value of the drive torque required of AC motor M1 (hereinafter, also referred to as target drive torque) Tbt and motor revolution count Nm from an externally provided ECU (Electric Control Unit), receives output voltage Vh from voltage sensor 13, receives DC voltage Vb from voltage sensor 10, and receives motor current MCRT from current sensor 24. Based on output voltage Vh, target drive torque Tbt, and motor current MCRT, control device 30 generates a signal PWMI to control the switching of IGBT elements Q3-Q8 of inverter 14 when inverter 14 drives AC motor M1 by a method that will be described afterwards, and provides the generated signal PWMI to inverter 14.

When inverter 14 drives AC motor M1, control device 30 generates a signal PWMC based on DC voltage Vb, output voltage Vh, target drive torque Tbt and motor revolution count MRN to control the switching of IGBT elements Q1 and Q2 of voltage-up converter 12 by a method that will be described afterwards, and provides the generated signal PWMC to voltage-up converter 12.

Further, control device 30 generates and provides to system relays SR1 and SR2 a signal SE to turn on/off system relays SR1 and SR2.

Figure 2:
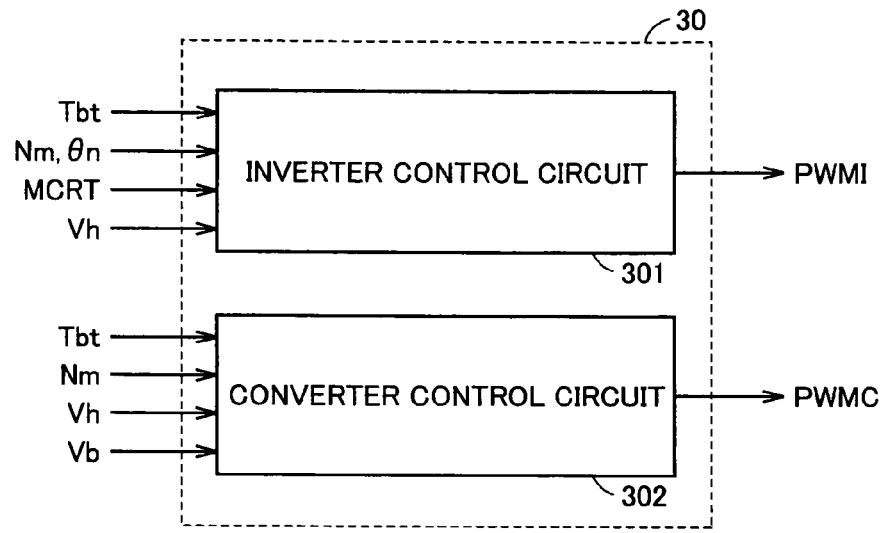
FIG. 2 is a functional block diagram of a control device of FIG. 1.

FIG. 2 is a functional block diagram of control device 30 of FIG. 1.

Referring to FIG. 2, control device 30 includes an inverter control circuit 301 and a converter control circuit 302.

Inverter control circuit 301 generates, when current motor M1 is driven, a signal PWMI to turn on/off IGBT elements Q3-Q8 of inverter 14 by a method that will be described afterwards, based on target drive torque Tbt, motor current MCRT and output voltage Vh, and provides the generated signal PWMI to inverter 14.

During regenerative braking of the hybrid vehicle or electric vehicle in which motor drive device 100 is incorporated, inverter control circuit 301 generates and provides to inverter 14 a signal PWMI to convert the AC voltage generated by AC motor M1 into DC voltage based on target control torque Tbt, motor current MCRT, and output voltage Vh.

Converter control circuit 302 generates a signal PWMC, based on target drive torque Tbt, motor revolution count Nm, output voltage Vh and DC voltage Vb to turn on/off IGBT elements Q1 and Q2 of voltage-up converter 12 by a method that will be described afterwards, and provides the generated signal PWMC to voltage-up converter 12.

During regenerative braking of the hybrid vehicle or electric vehicle in which motor drive device 100 is incorporated, converter control circuit 302 generates signal PWMC based on target drive torque Tbt, motor revolution count Nm, output voltage Vh and DC voltage Vb to lower the DC voltage from inverter 14, and provides the generated signal PWMC to voltage-up converter 12.

Figure 3:
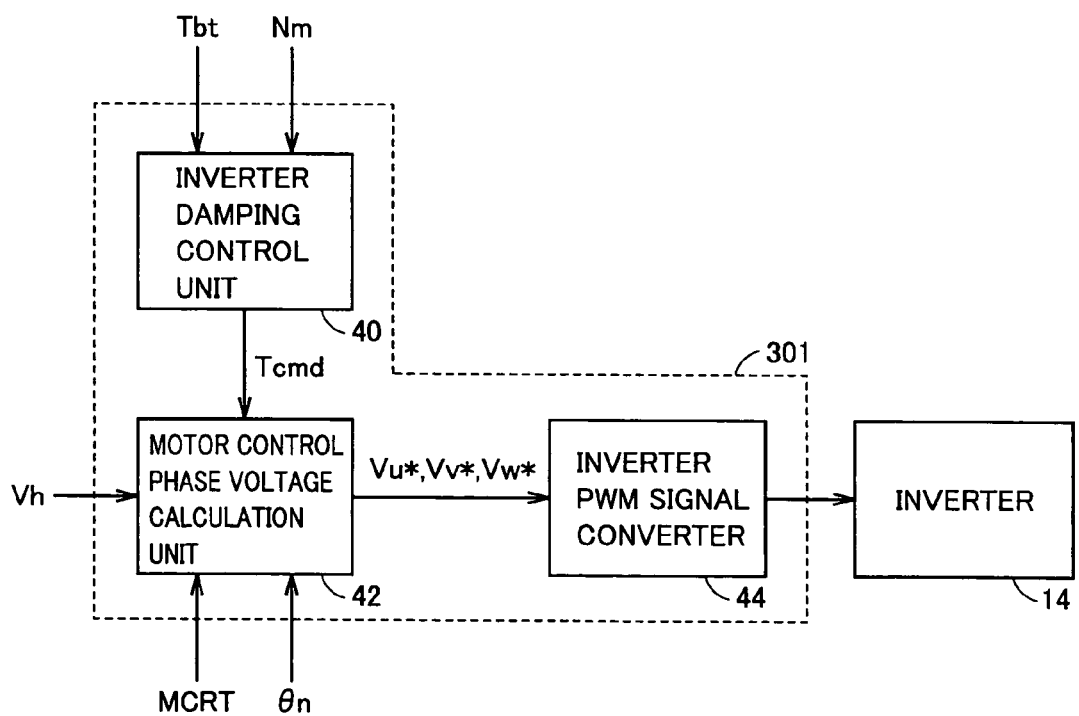
FIG. 3 is a functional block diagram of an inverter control circuit of FIG. 2.

FIG. 3 is a functional block diagram of inverter control circuit 301 of FIG. 2.

Referring to FIG. 3, inverter control circuit 301 includes a damping control unit 40 for the inverter, a phase voltage calculation unit 42 for motor control, and a PWM signal converter 44 for the inverter.

Inverter damping control unit 40 adds torque to cancel the torque variation (hereinafter, also referred to as damping torque) Tc to target drive torque Tbt from external ECU in order to suppress pulsation occurring at the output torque of AC motor M1.

By way of example, damping torque Tc is generated by extracting the variation component of the number of revolutions from the detected result of motor revolution count Nm and obtaining torque based on a phase opposite to the extracted variation component (damping torque). Generated damping torque Tc is added to target drive torque Tbt applied from external ECU. The added result is output to motor control phase voltage calculation unit 42 as torque command Tcmd.

Motor control phase voltage calculation unit 42 receives input voltage Vh of inverter 14 from voltage sensor 13, motor current MCRT flowing through each phase of AC motor M1 from current sensor 24, and torque command Tcmd from inverter damping control unit 40. Motor control phase voltage calculation unit 42 outputs control inputs Vu*, Vv*, and Vw* of the voltage to be applied to the coil of each phase of AC motor M1 based on the input signals set forth above.

Inverter PWM signal converter 44 actually generates signal PWMI to turn on/off each of IGBT elements Q3-Q8 of inverter 14 based on control inputs Vu*, Vv*, and Vw* of the voltage from motor control phase voltage calculation unit 42, and provides the generated signal PWMI to each of IGBT elements Q3-Q8.

In response, each of IGBT elements Q3-Q8 is subject to switching-control to control the current conducted to each phase of AC motor M1 such that AC motor M1 outputs the specified torque. Accordingly, motor drive current MCRT is controlled, and motor torque according to torque command Tcmd is output.

Figure 4:
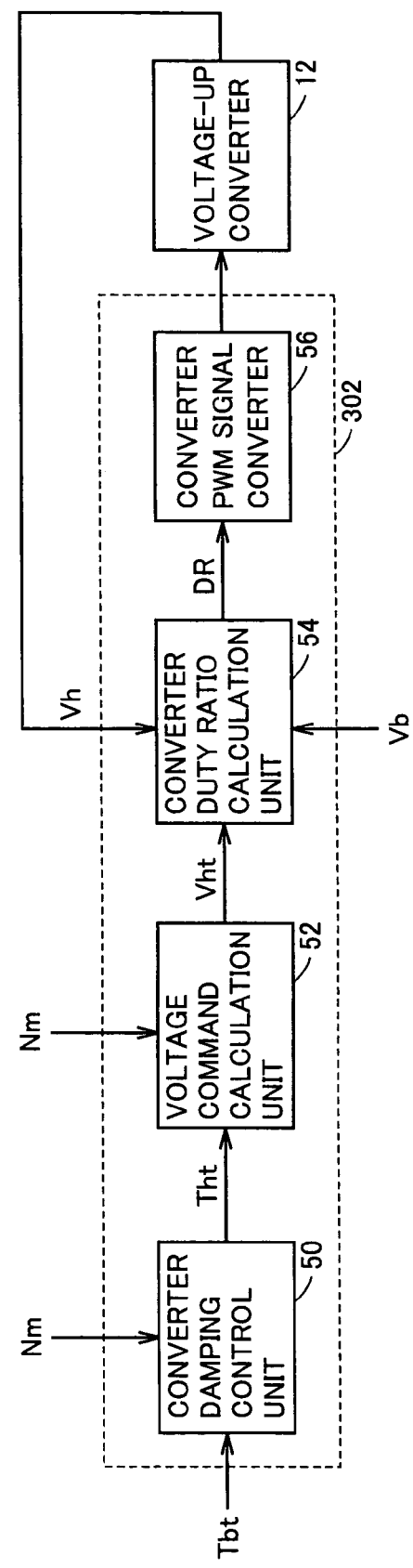
FIG. 4 is a functional block diagram of a converter control circuit of FIG. 2.

FIG. 4 is a functional block diagram of converter control circuit 302 of FIG. 2.

Referring to FIG. 4, converter control circuit 302 includes a damping control unit 50 for the converter, a voltage command calculation unit 52, a duty ratio converter 54 for the converter, and a PWMC signal converter 56 for the converter.

Converter damping control unit 50 adds damping torque Tcct to target drive torque Tbt from external ECU to generate torque command Tht that is to be used in the control of voltage-up converter 12.

It is to be noted that converter damping control unit 50 sets damping torque Tcct to a predetermined value independent of the revolution variation component appearing in motor revolution count Nm by a method that will be described afterwards, different from damping torque Tc generated at inverter damping control unit 40. The set damping torque Tcct is added to target drive torque Tbt from external ECU. The added result is output to voltage command calculation unit 52 as torque command Tht.

Voltage command calculation unit 52 calculates the optimum value of inverter input voltage Vh (target value), i.e. voltage command Vht, based on torque command Tht from converter damping control unit 50 and motor revolution count Nm from external ECU, and provides the calculated voltage command Vht to converter duty ratio calculation unit 54.

Converter duty ratio calculation unit 54 receives DC voltage Vb from voltage sensor 10, voltage Vh (=inverter input voltage) from voltage sensor 13, and voltage command Vht from voltage command calculation unit 52. Based on DC voltage Vb, converter duty ratio calculation unit 54 calculates a duty ratio DR to set inverter input voltage Vh to voltage command Vht. The calculated duty ratio DR is output to converter PWM signal converter 56.

Converter PWM signal converter 56 generates a signal PWMC to turn on/off IGBT elements Q1 and Q2 of voltage-up converter 12 based on duty ratio DR from converter duty ratio calculation unit 54. The generated signal PWMC is output to voltage-up converter 12.

Figure 5:
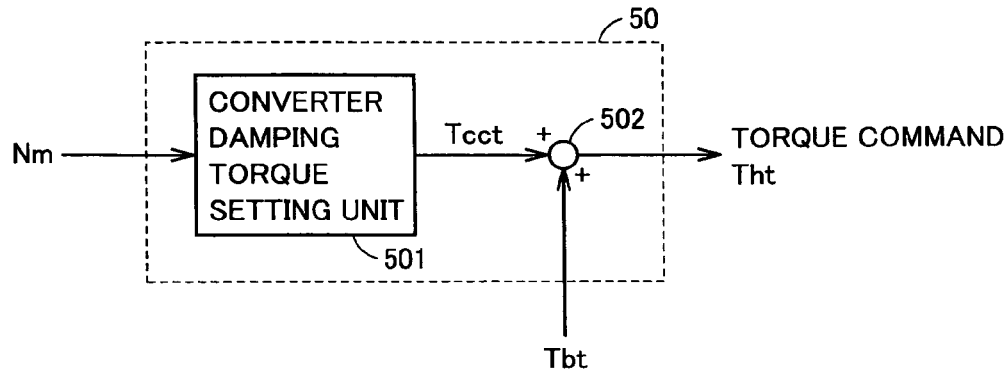
FIG. 5 is a functional block diagram of a converter damping control unit of FIG. 4.

FIG. 5 is a functional block diagram of converter damping control unit 50 of FIG. 4.

Referring to FIG. 5, converter damping control unit 50 includes a damping torque setting unit 501 for the converter, and an adder 502.

Converter damping torque setting unit 501 fixes damping torque Tcct to a predetermined value that is set in advance for output. The predetermined value is set to an upper limit value Tc_max of damping torque Tc that can be set in damping control. Damping torque upper limit value Tc_max is preset for damping torque Tc taking into account the stability of damping control.

In other words, damping torque Tcct for converter control is a fixed value independent of motor revolution count Nm, as compared to damping torque Tc generated by inverter damping control unit 40 and that is variable corresponding to motor revolution count Nm.

The reason why damping torque Tcct is fixed to damping torque upper limit value Tc_max will be explained hereinafter.

Figure 6:
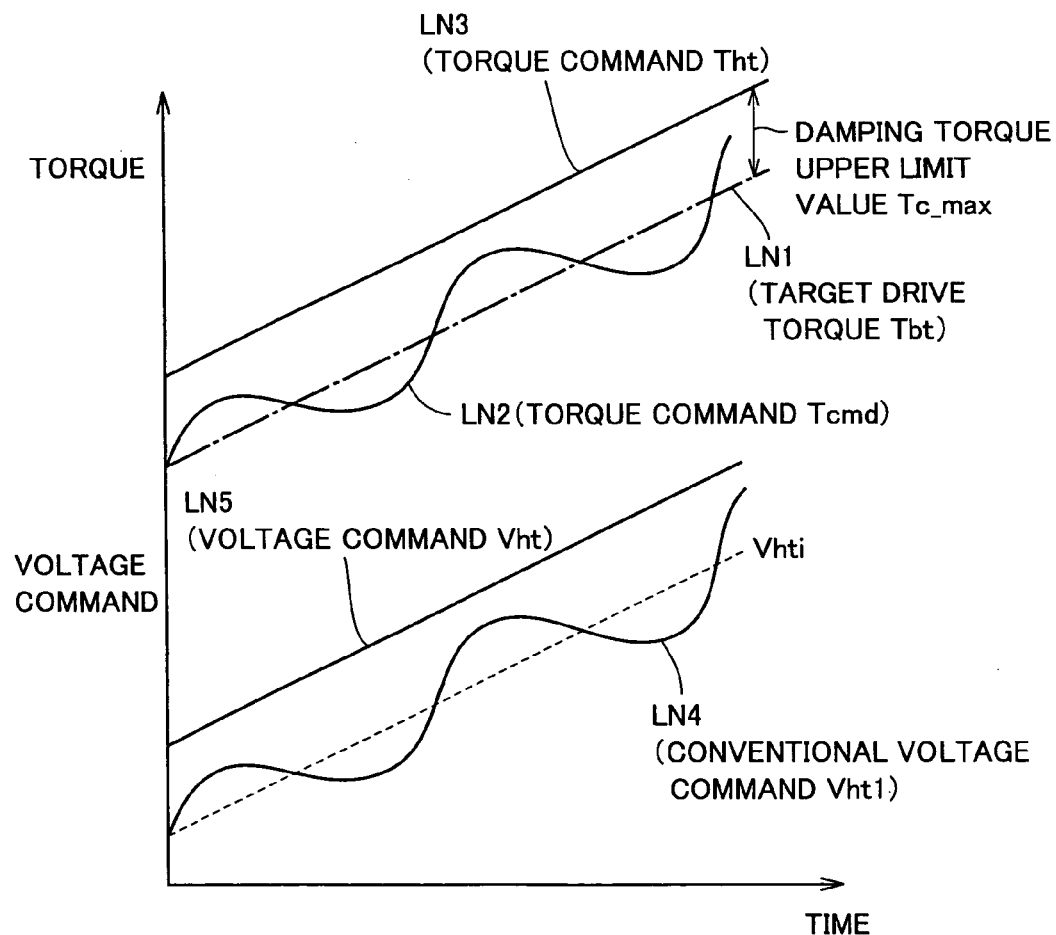
FIG. 6 is a diagram to describe the relationship between a torque command and a voltage command.

FIG. 6 is a diagram to describe the relationship between torque command Tht and voltage command Vht.

Referring to FIG. 6, it is assumed that target drive torque Tbt applied from external ECU exhibits a waveform that increases monotonously as indicated by a straight line LN1. Torque command Tcmd obtained by adding damping torque Tc generated based on the variation component of motor revolution count Nm with target drive torque Tbt exhibits a waveform that varies above and below target drive torque Tbt, as indicated by line LN2. Inverter control circuit 301 controls motor drive current MCRT such that AC motor M1 outputs torque corresponding to torque command Tcmd.

Likewise at converter control circuit 302, assuming that the voltage command of voltage-up converter 12 is calculated based on torque command Tcmd that has this varying waveform, the calculated voltage command Vht1 exhibits a varying waveform that repeats increase and decrease with respect to voltage command Vht1 corresponding to the essential target drive torque Tbt, as shown by line LN4.

By conducting voltage conversion control of voltage-up converter 12 according to such varying voltage command Vht1, a voltage-up operation and voltage-down operation will be frequently repeated at voltage-up converter 12 according to the increase and decrease of voltage command Vht1.

When a voltage-up operation is conducted according to the increase of voltage command Vht1 at smoothing capacitor C2 provided between the output side of voltage-up converter 12 and the input side of inverter 14 at this stage, the increase of the stored power at capacitor C2 will be supplied from voltage-up converter 12 in addition to the output power of AC motor M1. As a result, the output power of voltage-up converter 12 will become excessive, leading to the possibility of increasing the current passing through IGBT elements Q1 and Q2 constituting voltage-up converter 12. In contrast, when a voltage-down operation is conducted according to the decrease of voltage command Vht1, the decrease of the stored power at capacitor C2 will be regenerated at voltage-up converter 12. As a result, there is a possibility of excessive current passing through IGBT elements Q1 and Q2.

The passage of the excessive current through voltage-up converter 12 caused by the varying voltage command Vht1 imposes the problem of destroying IGBT elements Q1 and Q2 constituting voltage-up converter 12 to cause hardware failure.

Further, by the increase of power loss at voltage-up converter 12, it will become difficult to operate AC motor M1 at high efficiency. This will deviate from the former purpose to operate AC motor M1 at high efficiency by incorporating a level conversion function of DC voltage from battery B to allow adjustment of the motor drive voltage that is the applied voltage to inverter 14 for motor driving according to the motor operating state (number of revolutions, torque, and the like).

There is a problem that output voltage Vh of voltage-up converter 12 cannot be made to follow voltage command Vht1 since the varying cycle of damping torque Tc is extremely short with respect to the control cycle required for voltage conversion at voltage-up converter 12. Therefore, there is a possibility that the motor drive voltage will not meet voltage command Vht1, so that AC motor M1 cannot output the desired torque required for damping control.

Motor drive device 100 according to an embodiment of the present invention is characterized in that torque command Tht employed in the calculation of voltage command Vht of voltage-up converter 12 is generated by adding damping torque upper limit value Tc_max to target drive torque Tbt, as indicated by line LN3 in FIG. 6.

Damping torque upper limit value Tc_max is preset in view of preventing damping torque Tc from significantly exceeding the normal variation range by the noise component superimposed on motor revolution count Nm at motor drive device 100.

Accordingly, torque command Tht becomes independent of the varying component of motor revolution count Nm, and exhibits a waveform without variation. Further, voltage command Vht calculated based on this torque command Tht will exhibit a waveform without variation, as indicated by straight line LN5. Therefore, increase in the current passing through voltage-up converter 12 due to variation in voltage command Vht can be prevented. As a result, AC motor M1 can be further improved in efficiency by virtue of reducing power loss of voltage-up converter 12. Additionally, voltage-up converter 12 can be protected from element fracture.

By conducting voltage conversion according to voltage command Vht, inverter input voltage Vh can be maintained at a level sufficiently higher than motor drive voltage required to output the torque for damping control, i.e. torque command Tcmd. As a result, damping control can be effected stably without insufficient output torque from AC motor M1.

Figure 7:
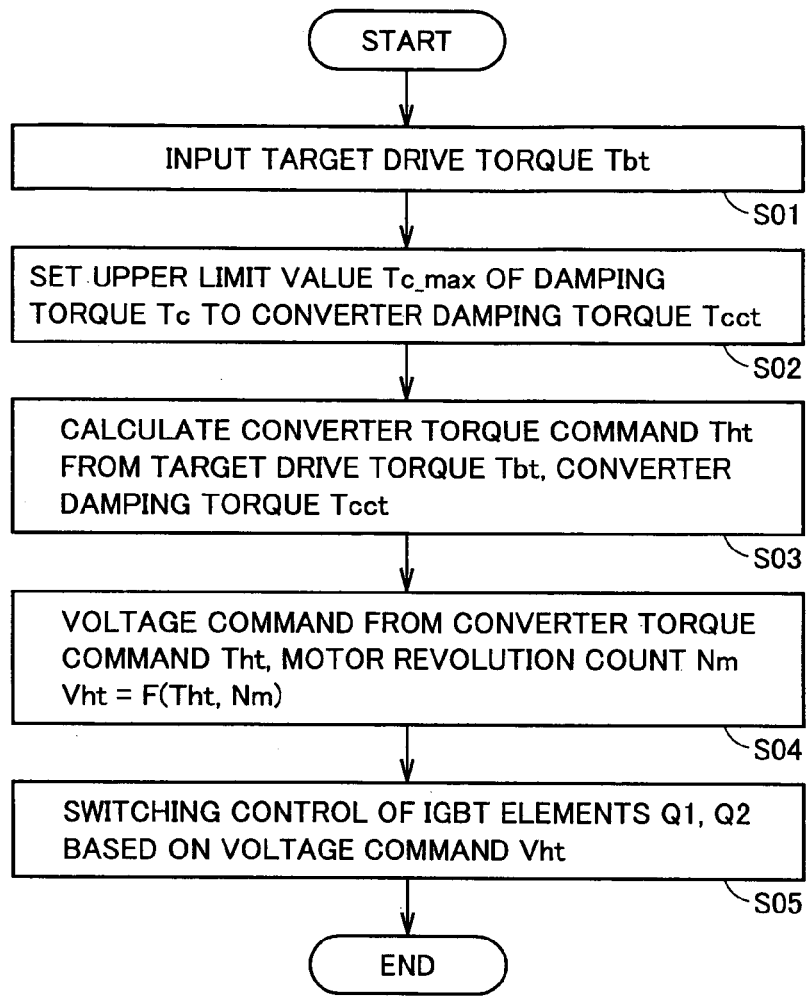
FIG. 7 is a flow chart to describe voltage conversion control according to the first embodiment of the present invention.

FIG. 7 is a flow chart to describe voltage conversion control according to the first embodiment of the present invention.

Referring to FIG. 7, when drive control of AC motor M1 is initiated, target drive torque Tbt of AC motor M1 is calculated according to the accelerator operation or the like by the driver. The calculated target drive torque Tbt is applied to each of inverter control circuit 301 and converter control circuit 302 (step S01).

Inverter control circuit 301 extracts the variation component of motor revolution count Nm, and generates damping torque Tc from the revolution variation component, independent of the flow chart of FIG. 7. Inverter control circuit 301 adds the generated damping torque Tc with target drive torque Tbt, which is set as torque command Tcmd employed in motor drive control.

Converter control circuit 302 sets damping torque upper limit value Tc_max to damping torque Tcct (step S02), and adds the set damping torque Tcct with target drive torque Tbt from external ECU, which is set as torque command Tht employed in the calculation of voltage command Vht (step S03).

Then, voltage command Vht is calculated by equation (1) set forth below based on the set torque command Tht and motor revolution count Nm from external ECU (step S04).

$$Vht = F(Tht, Nm) \quad (1)$$

where F (Tht, Nm) is a function to calculate motor drive voltage Vh optimum for the target operating state (Tht, Nm) of AC motor M1.

By controlling switching of IGBT elements Q1 and Q2 of voltage-up converter 12 based on voltage command Vht (step S05), motor drive voltage Vh sufficient for a torque output specified by torque command Tcmd is applied stably to inverter 14.

According to the first embodiment of the present invention, increase in the current passing through the voltage-up converter can be suppressed by suppressing variation of the voltage command. As a result, power loss at voltage-up converter 12 can be reduced to improve the system efficiency. Further, the voltage-up converter can be protected from element fracture.

Second Embodiment

In the previous first embodiment, torque command Tht at converter control circuit 302 is generated using damping torque Tcct fixed to damping torque upper limit value Tc_max, independent of inverter control circuit 301.

Although variation in voltage command Vht is suppressed by taking a fixed value for damping torque Tcct, a high voltage exceeding the level of the motor drive voltage required for damping control will be constantly output from voltage-up converter 12. This will increase the power loss of voltage-up converter 12 and also increase motor loss occurring at AC motor M1. Such increase in loss will become the cause of deteriorating fuel efficiency of the vehicle in which motor drive device 100 is incorporated.

In addition to damping control set forth above, motor drive device 100 controls the output torque of AC motor M1 such that the power balance of the entire device does not exceed the input/output limit of battery B. This is directed to preventing charging/discharging of battery B by excessive power.

In accordance with motor drive device 100, the power consumed by AC motor M1 driving in a power running mode is adjusted to avoid exceeding the output limit of battery B. Further, the power generated by AC motor M1 driving in the regenerative mode is adjusted to avoid exceeding the input limit of battery B.

In detail, the motor consumed power and motor generated power are both calculated by multiplying the output torque from AC motor M1 by motor revolution count Nm. The upper limit value of torque that may be output from AC motor M1 is calculated such that the calculated motor consumed power and motor generated power do not exceed the input/output limit of battery B. Therefore, the calculated upper limit value torque will be limited to become smaller as motor revolution count Nm becomes higher.

In view of the foregoing, the second embodiment of the present invention is directed to setting damping torque upper limit value Tc_max that is added to target drive torque Tbt to become gradually smaller as motor revolution count Nm becomes higher. Accordingly, charging/discharging of the battery B by excessive power can be prevented regardless of whether motor revolution count Nm is high or low. Further, power loss of voltage-up converter 12 and AC motor M1 can be reduced to realize operation of AC motor M1 at high efficiency.

Figure 8:
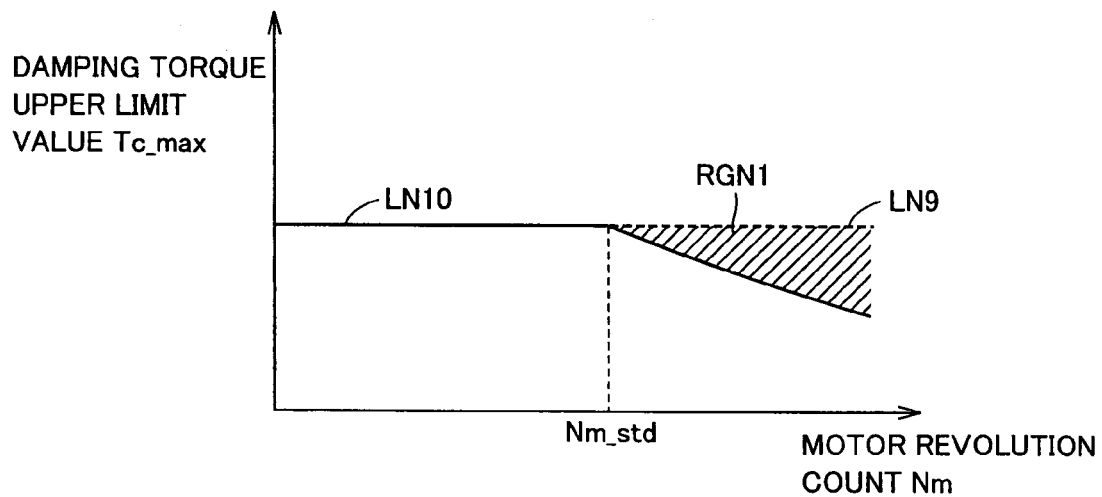
FIG. 8 represents the relationship between a damping torque upper limit value and motor revolution count.

FIG. 8 is a diagram representing the relationship between damping torque upper limit value Tc_max and motor revolution count Nm.

It is appreciated from FIG. 8 that damping torque upper limit value Tc_max is fixed to a predetermined value Tc_max1 that is set in advance in the region where motor revolution count Nm is equal to or below a predetermined threshold value Nm_std, as indicated by line LN10. At the region where motor revolution count Nm is higher than predetermined threshold value Nm_std, damping torque upper limit value Tc_max is set to gradually decrease from the level of predetermined value Tc_max1 according to a higher motor revolution count Nm.

For comparison with line LN10, line LN9 in FIG. 8 represents the relationship between damping torque upper limit value Tc_max and motor revolution count Nm when damping torque upper limit value Tc_max is fixed to predetermined value Tc_max1.

In comparison between line LN10 and line LN9 in FIG. 8, damping torque upper limit value Tc_max is lower at line LN10 in the region where motor revolution count Nm is higher than predetermined threshold value Nm_std. Therefore, the set torque command Tht becomes lower with respect to target drive torque Tbt of the same level. Thus, it is determined that voltage command Vht calculated based on torque command Tht is relatively lower at line LN10 than line LN9.

By setting damping torque upper limit value Tc_max variable according to motor revolution count Nm, the power loss of voltage-up converter 12 and motor loss can be reduced by a level corresponding to the power indicated at region RGN in FIG. 8, as compared to damping torque upper limit value Tc_max taking a fixed value. As a result, high efficiency of AC motor M1 is allowed.

Figure 9:
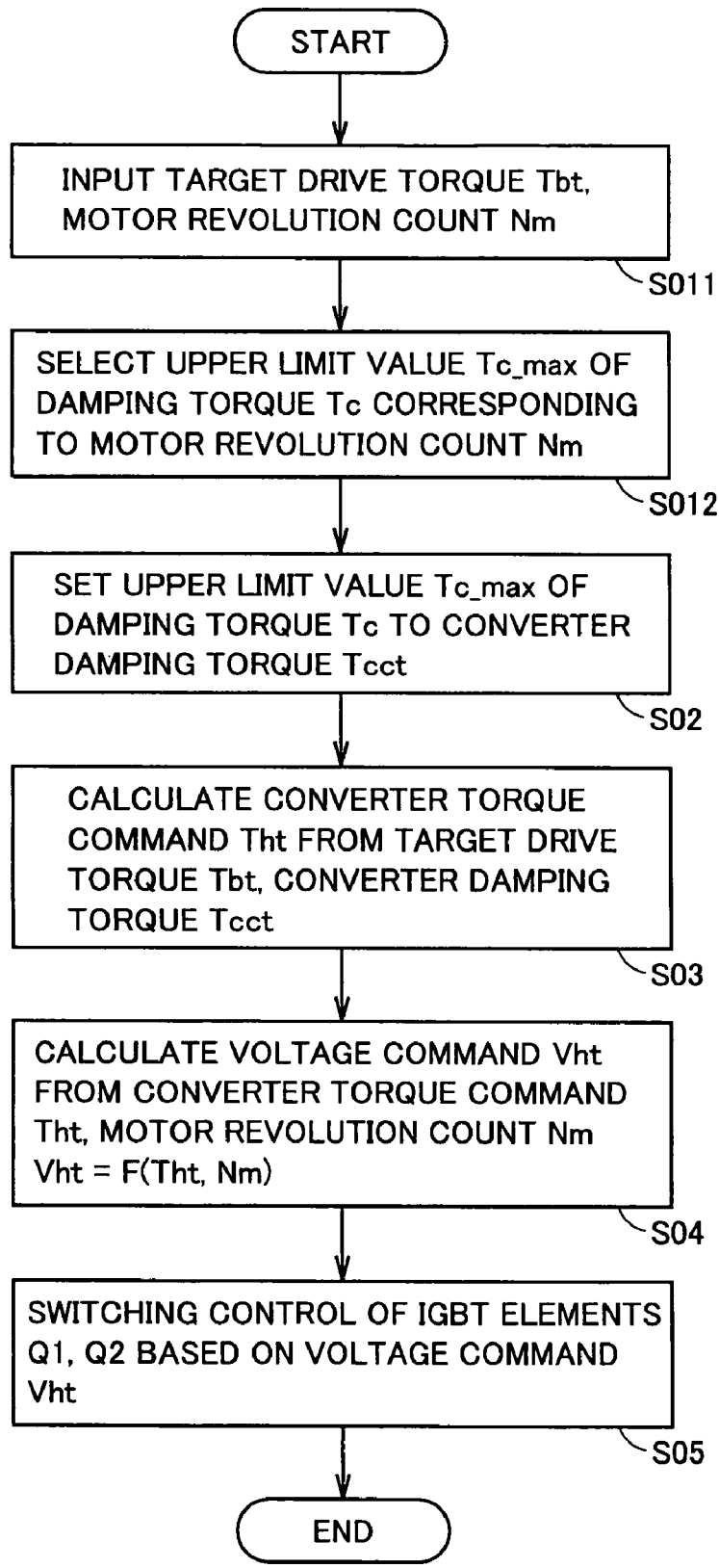
FIG. 9 is a flow chart to describe voltage conversion control according to a second embodiment of the present invention.

FIG. 9 is a flow chart to describe voltage conversion control according to the second embodiment of the present invention. The flow chart of FIG. 9 corresponds to the flow chart of FIG. 7, provided that step S01 in FIG. 7 is modified to steps S011 and S012. Therefore, detailed description of the operation of steps S02 and et seq. will not be repeated.

Referring to FIG. 9, when the drive control of AC motor M1 is initiated, target drive torque Tbt of AC motor M1 is calculated according to the accelerator operation or the like by the driver. The calculated target drive torque Tbt is applied together with motor revolution count Nm to inverter control circuit 301 and converter control circuit 302 (step S011).

Converter control circuit 302 stores, in its internal storage region, a map indicating the relationship between motor revolution count Nm and damping torque upper limit value Tc_max shown in FIG. 8. Converter control circuit 302 selects damping torque upper limit value Tc_max corresponding to the input motor revolution count Nm from the map of FIG. 8 (step S012).

Damping torque upper limit value Tc_max selected at step S012 is set to damping torque Tcct (step S012), and added to target drive torque Tbt applied from external ECU. The added result is set to torque command Tht (step S03).

[Modification]

As described with reference to FIG. 8, damping torque upper limit value Tc_max is set variable according to motor revolution count Nm to protect battery B and voltage-up converter 12 as well as to realize operation of AC motor M1 at high efficiency.

As will be described in the present modification, improvement of fuel efficiency can be facilitated without degrading the riding comfort of the vehicle by adapting a configuration in which damping torque upper limit value Tc_max is set variable according to the speed of the vehicle in which motor drive device 100 is incorporated.

Figure 10:
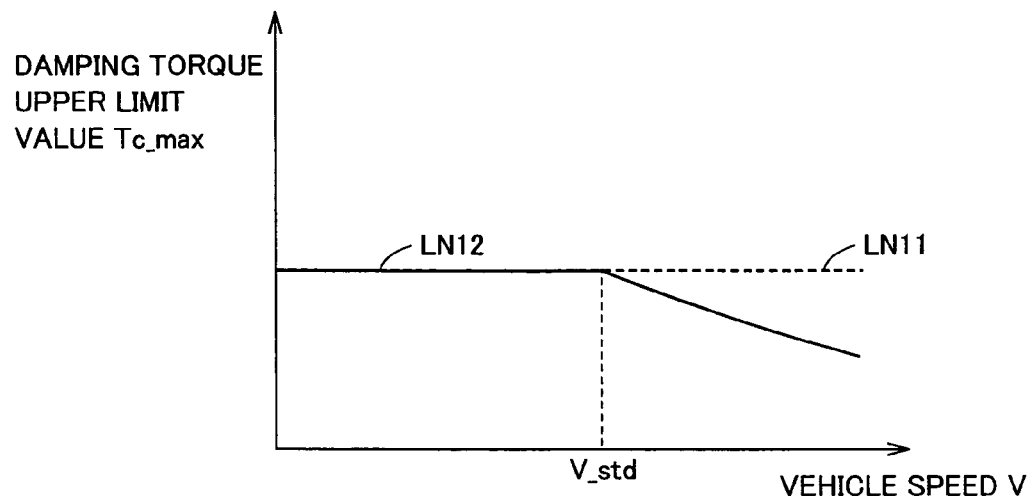
FIG. 10 is a diagram representing the relationship between the speed of a vehicle in which a motor drive device is incorporated and a damping torque upper limit value.

FIG. 10 represents the relationship between vehicle speed V of the vehicle in which motor drive device 100 is incorporated and damping torque upper limit value Tc_max.

It is appreciated from FIG. 10 that damping torque upper limit value Tc_max is set to gradually decrease as the vehicle speed becomes higher, as indicated by line LN12. For the sake of comparison, the relationship between vehicle speed V and damping torque upper limit value Tc_max when damping torque upper limit value Tc_max is fixed at a constant value Tc_max1, independent of vehicle speed V, is indicated by line LN11 in FIG. 10.

It is apparent from FIG. 10 that damping torque upper limit value Tc_max of line LN12 is lower than constant value Tc_max1 at the region exceeding predetermined vehicle speed V_std.

The configuration of decreasing damping torque upper limit value Tc_max according to a higher vehicle speed V is employed based on the fact that the required damping torque is reduced since the revolution variation component caused by a sudden change in target drive torque Tbt and motor revolution count Nm becomes relatively smaller in proportion to a higher vehicle speed V. In other words, since the torque pulsation is smaller in the region where vehicle speed V is high than in the region where vehicle speed V is low, sufficient riding comfort of a vehicle can be ensured by setting damping torque upper limit value Tc_max to a relatively low value.

By reducing damping torque upper limit value Tc_max at the region where vehicle speed V is high, torque command Tht applied to voltage command calculation unit 52 is set to a relatively lower value than torque command Tht when damping torque upper limit value Tc_max is set to a constant value Tc_max1. Voltage command Vht calculated on the basis of torque command Tht also becomes lower as torque command Tht decreases. This eliminates the useless boosting of the motor drive voltage when vehicle speed V is high. Therefore, power loss of voltage-up converter 12 and motor loss can be reduced. Thus, fuel efficiency of the vehicle can be improved.

By setting the damping torque upper limit value variable according to the motor revolution count in the second embodiment of the present invention, charging/discharging of the battery by excessive current can be prevented, and power loss of the voltage-up converter and AC motor can be reduced to allow high frequency operation of the AC motor.

By setting the damping torque upper limit value variable according to the vehicle speed, power loss of the voltage-up converter and motor loss can be reduced to allow improvement of fuel efficiency without degrading the riding comfort of the vehicle.

Third Embodiment

Damping control is effective to suppress vehicle variation caused by torque pulsation when there is a sudden change in the torque command and/or motor revolution. If damping control is conducted uniformly even in the case where determination is made that effectiveness in damping control is relatively low, i.e. when torque pulsation is relatively low, voltage command Vht will constantly be raised corresponding to the damping torque upper limit value, leading to the problem that power loss of voltage-up converter 12 is increased unfavorably.

In view of the foregoing, the third embodiment of the present invention is configured to determine the effectiveness/ineffectiveness of damping control and suspend damping control, when determination is made that damping control is not effective, to prevent voltage command Vht from being increased corresponding to damping torque upper limit value Tc_max.

Figure 11:
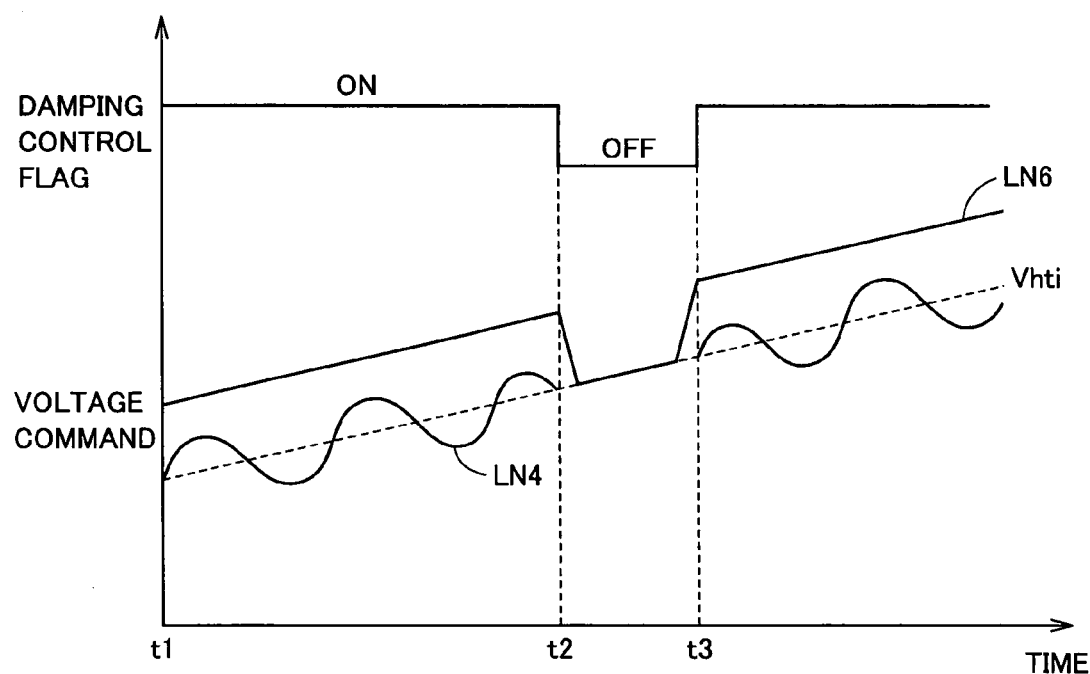
FIG. 11 is a diagram to describe a voltage command according to a third embodiment of the present invention.

FIG. 11 is a diagram to describe voltage command Vht according to the third embodiment of the present invention.

Referring to FIG. 11, the damping control flag is set ON when damping control is to be executed, and set OFF when damping control is suspended. Execution/suspension of damping control is determined according to the determination result of effective/ineffective damping control by converter damping control unit 50 of converter control circuit 302. Determination of whether damping control is effective or ineffective is made based on target drive torque Tbt and motor revolution count Nm input from external ECU applied to converter damping control unit 50.

Specifically, converter damping control unit 50 determines that damping control is effective in response to a sudden change in target drive torque Tbt or motor revolution count Nm. In response to determination of damping control being effective, the damping control flag is set to an on state instructing execution of damping control.

In contrast, converter damping control unit 50 determines that damping control is ineffective when target drive torque Tbt and motor revolution count Nm do not change suddenly. In this case, the damping control flag is set to an off state instructing suspension of damping control according to an ineffective damping control determination.

Converter damping torque setting unit 501 sets damping torque Tcct according to an ON or OFF setting of the damping control flag. Specifically, when the damping control flag is set to an on state, converter damping torque setting unit 501 outputs damping torque upper limit value Tc_max to adder 502 as damping torque Tcct. Accordingly, the added result of target drive torque Tbt and damping torque Tcct is output to voltage command calculation unit 52 as torque command Tht.

When the damping control flag is set to an off state, converter damping torque setting unit 501 sets damping torque Tcct to zero and provides this damping torque to adder 502. Accordingly, target drive torque Tbt is directly output to voltage command calculation unit 52 as torque command Tht.

Voltage command calculation unit 52 calculates voltage command Vht based on the input torque command Tht for each of an execution mode and suspension mode of damping control. As indicated by line LN6 in FIG. 11, the calculated voltage command Vht is raised corresponding to damping torque Tcct with respect to voltage command Vht1 calculated based on target drive torque Tbt from time t1 to time t2, and time t3 onward, during which the damping control flag is ON. During the period from time t2 to time t3 when the damping control flag is OFF, voltage command Vht is equal to voltage command Vht1 calculated based on target drive torque Tbt.

By a configuration of not adding damping torque Tcct to target drive torque Tbt when damping control is not effective, the useless boosting of the motor drive voltage during the period when damping control is suspended can be prevented. As a result, power loss of voltage-up converter 12 can be further reduced to allow AC motor M1 of higher efficiency.

Figure 12:
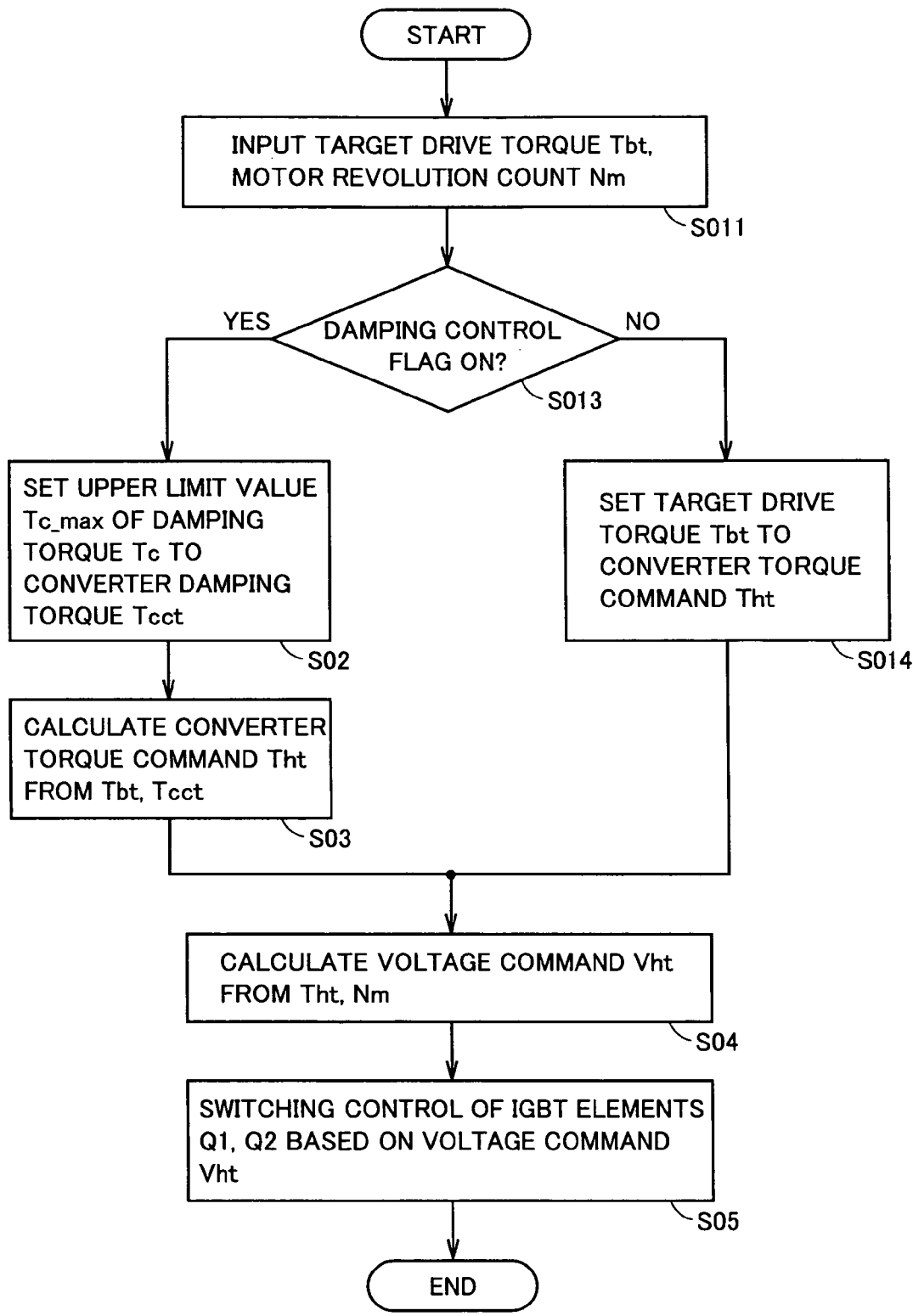
FIG. 12 is a flow chart to describe voltage conversion control according to the third embodiment of the present invention.

FIG. 12 is a flow chart to describe voltage conversion control according to a third embodiment of the present invention.

Referring to FIG. 12, when drive control of AC motor M1 is initiated, target drive torque Tbt of AC motor M1 is calculated based to an accelerator operation or the like by the driver. The calculated target drive torque Tbt is applied together with motor revolution count Nm to both inverter control circuit 301 and converter control circuit 302 (step S011).

Converter control circuit 302 first determines whether damping control is effective/ineffective based on target drive torque Tbt and motor revolution count Nm. The damping control flag is set to an on state or an off state according to the determination result.

Converter damping torque setting unit 501 determines whether the damping control flag is ON or not (step S013). When determination is made that the damping control flag is ON at step S013, i.e. determination of damping control being effective, converter damping torque setting unit 501 sets damping torque upper limit value Tc_max to damping torque Tcct (step S02). The set damping torque Tcct is added with target drive torque Tbt from external ECU, and set to torque command Tht employed in the calculation of voltage command Vht (step S03).

When determination is made that the damping control flag is OFF at step S013, i.e. determination of damping control being ineffective, converter damping torque setting unit 501 directly sets target drive torque Tbt as torque command Tht (step S014). Torque command Tht set at each of steps S03 and S014 is provided to voltage command calculation unit 52.

Voltage command calculation unit 52 calculates voltage command Vht based on torque command Tht and motor revolution count Nm from external ECU (step S04). By controlling the switching of IGBT elements Q1 and Q2 of voltage-up converter 12 based on the calculated voltage command Vht (step S05), motor drive voltage Vh of a level sufficient to output the torque specified by torque command Tcmd can be applied stably to inverter 14.

[Modification]

By suspending damping control when damping control is not effective to suppress increase of voltage command Vht corresponding to the damping torque as set forth above, power loss at voltage-up converter 12 can be reduced.

Since output voltage Vh from voltage-up converter 12 changes abruptly corresponding to the damping torque at the timing of switching between execution and suspension of damping control, the stored power at capacitor C2 will vary abruptly corresponding to the voltage variation. This increase of the stored power is supplied from battery B to voltage-up converter 12. The reduced amount of stored power is supplied to battery B via voltage-up converter 12. In other words, battery B will be charged/discharged instantaneously at every switching between execution and suspension of damping control.

Battery B has the power that can be input and output limited, as mentioned before. The limit thereof becomes stricter as the temperature of battery B becomes lower. If power exceeding the input/output limit of battery B is charged or discharged according to the switching between execution and suspension of damping control when the battery temperature is low, voltage surge will occur instantaneously at the DC voltage of battery B, leading to the possibility of damaging battery B.

In order to prevent occurrence of voltage surge at battery B at the time of switching between execution and suspension of damping control, the present modification is directed to a configuration in which switching from execution to suspension of damping control is not carried out and execution of damping control is continued when the battery temperature is low.

Figure 13:
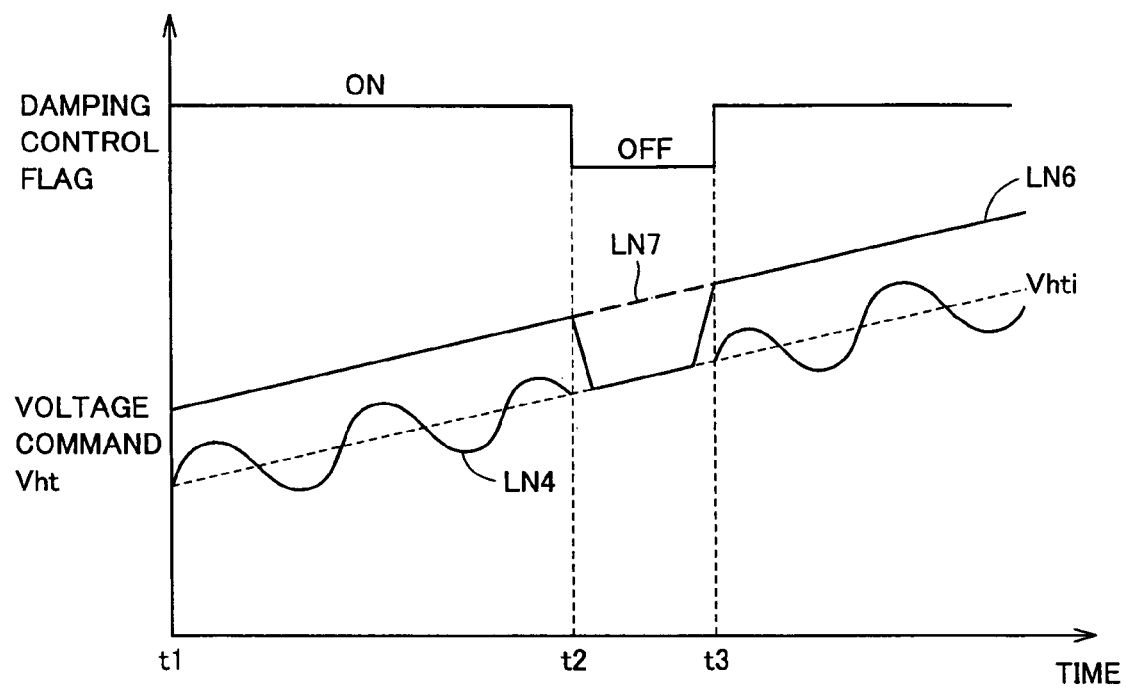
FIG. 13 is a diagram to describe a voltage command according to a modification of the third embodiment of the present invention.

FIG. 13 is a diagram to describe voltage command Vht according to the modification of the third embodiment.

It is appreciated from FIG. 13 that, when the battery temperature is low, voltage command Vht is maintained at the level of voltage command Vht corresponding to an on state of the damping control flag without decreasing to the level of voltage command Vht1 based on target drive source TBt during the period of time t2 to time t3 where the damping control flag is OFF, as indicated by line LN7. Therefore, the charging/discharging of the battery B occurring instantaneously at times t2 and t3 can be prevented to protect battery B from voltage surge.

Figure 14:
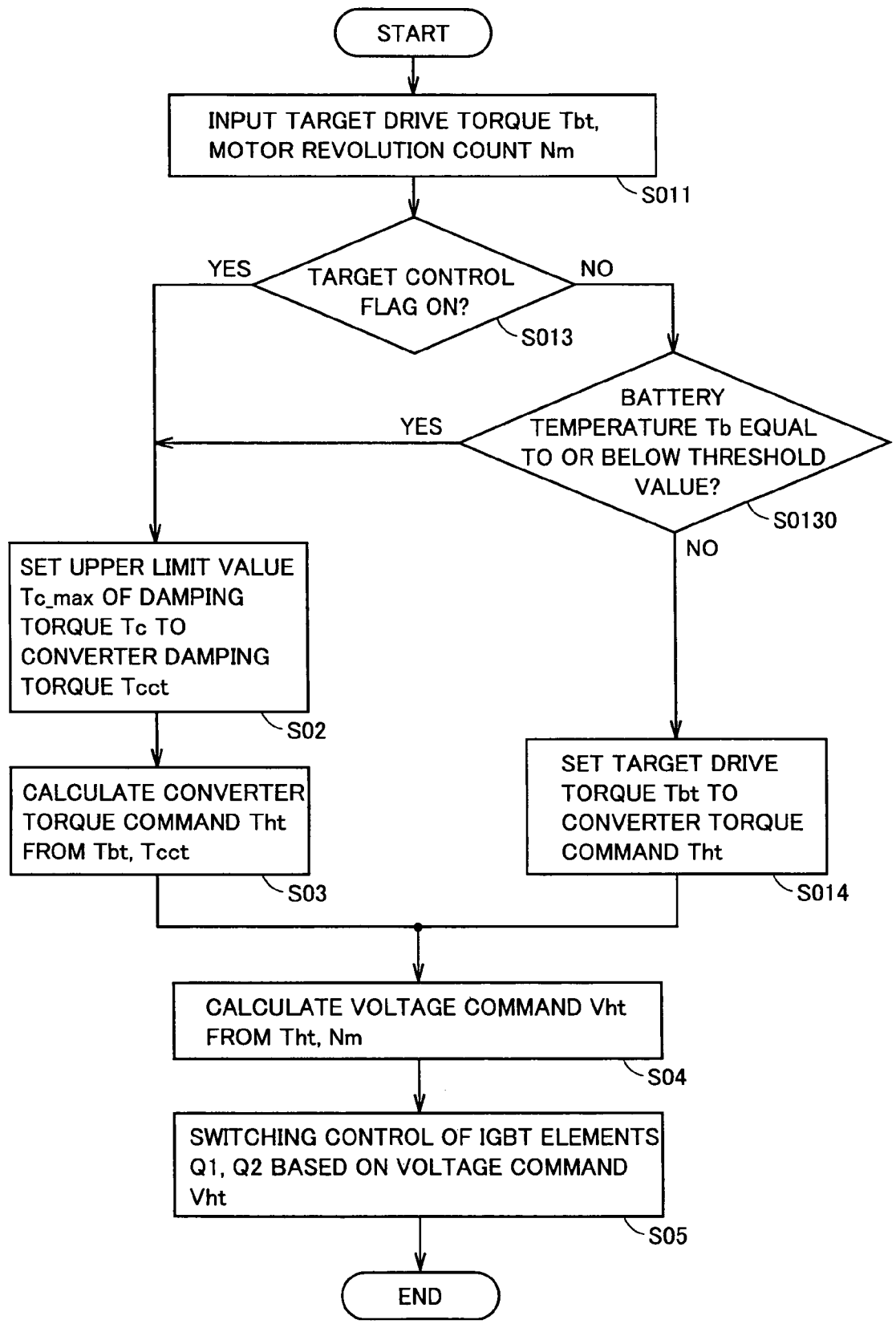
FIG. 14 is a flow chart to describe voltage conversion control according to a modification of the third embodiment of the present invention.

FIG. 14 is a flow chart to describe voltage conversion control according to the modification of the third embodiment.

Referring to FIG. 14, when drive control of AC motor M1 is initiated, target drive torque Tbt of AC motor M1 is calculated according to an accelerator operation or the like by the driver. The calculated target drive torque Tbt is applied together with motor revolution count Nm to inverter control circuit 301 and converter control circuit 302 (step S011).

Converter control circuit 302 first determines whether damping control is effective/ineffective based on target drive torque Tbt and motor revolution count Nm. The damping control flag is set to an on state or an off state according to the determination result.

Converter damping torque setting unit 501 determines whether the damping control flag is ON or not (step S013). When determination is made that the damping control flag is ON, i.e. when determination is made that damping control is effective at step S013, converter damping torque setting unit 501 sets damping torque upper limit value Tc_max to damping torque Tcct (step S02). The set damping torque Tcct is added with target drive torque Tbt from external ECU to be set as torque command Tht used for the calculation of voltage command Vht (step S03).

When determination is made that the damping control flag is OFF, i.e. when determination is made that damping control is ineffective at step S013, converter damping torque setting unit 501 determines whether the temperature of battery B is at most a predetermined threshold value (step S0130).

When determination is made that the temperature of battery B is equal to or lower than the predetermined threshold value at step S0130, damping torque upper limit value Tc_max is set to damping torque Tcct, likewise the case where damping control is effective (step S02). In contrast, when determination is made that the temperature of battery B is higher than predetermined threshold value, target drive torque Tbt is directly set as torque command Tht (step S014). Torque command Tht set at each of steps S03 and S014 is provided to voltage command calculation unit 52.

Voltage command calculation unit 52 calculates voltage command Vht based on torque command Tht and motor revolution count Nm from external ECU (step S04). By controlling switching of IGBT elements Q1 and Q2 of voltage-up converter 12 based on the calculated voltage command Vht (step S05), motor drive voltage Vh of a level sufficient for output of torque specified by torque command Tcmd is applied stably to inverter 14.

By a configuration of not adding damping torque to the target drive torque when damping control is ineffective according to the third embodiment of the present invention, useless boosting of motor drive voltage during the period where damping control is suspended can be prevented. As a result, power loss of voltage-up converter 12 is further reduced, allowing higher efficiency of AC motor M1.

Further, by continuing execution of damping control without switching to suspension when the input/output limit of the battery is strict, for example, when the battery temperature is low, occurrence of voltage surge at the battery can be prevented.

Fourth Embodiment

Figures 15, 16, 17:
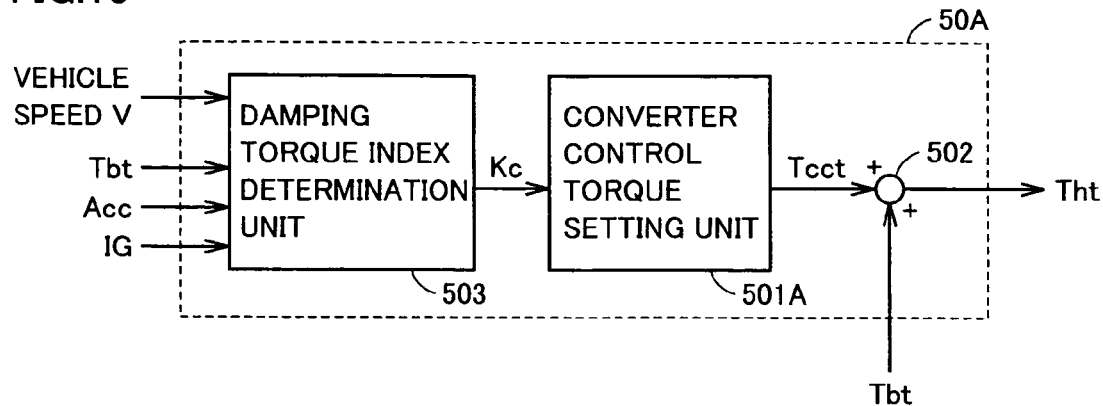
FIG. 15 is a functional block diagram of a converter damping control unit in a motor drive device according to a fourth embodiment of the present invention.
FIG. 16 represents the relationship between a vehicle state and a damping torque index.
FIG. 17 represents the relationship between a damping torque index and damping torque.

FIG. 15 is a functional block diagram of a converter damping control unit in a motor drive device according to a fourth embodiment of the present invention. The motor drive device of the fourth embodiment is similar to motor drive device 100 of FIG. 1, provided that converter damping control unit 50 shown in FIG. 5 is replaced with a converter damping control unit 50A shown in FIG. 15. Therefore, description of similar elements will not be repeated.

Referring to FIG. 15, converter damping control unit 50A includes a damping torque index determination unit 503, a converter damping torque setting unit 501A, and an adder 502.

Damping torque index determination unit 503 receives an input signal from various elements of the vehicle via external ECU. These input signals include, for example, vehicle speed V detected by a vehicle speed sensor, an accelerator press-down amount detected by an accelerator pedal position sensor, a signal IG indicating the operation state of ignition (IG), and target drive torque Tbt.

Damping torque index determination unit 503 determines the vehicle state based on these input signals. Specifically, determination is made whether the vehicle is in an extremely low running mode or not based on vehicle speed V. Further, determination is made whether the vehicle is accelerating or not based on the accelerator press-down amount. Further, determination is made whether the engine is at an engine startup or stop state based on signal IG.

Then, damping torque index determination unit 503 determines a damping torque index Kc with respect to the determined vehicle state. Damping torque index Kc is used for setting damping torque Tcct. Damping torque Tcct is represented by a function of damping torque index Kc, as in the following equation (2):

$$Tcct = Tccv\_tb1(Kc) \qquad (2)$$

where $Tccv\_tb1(x)$ is a function to calculate damping torque Tcct corresponding to x.

Determination of the damping torque index is carried out by preparing a table indicating the relationship between the vehicle state and damping torque index shown in FIG. 16, and selecting a damping torque index corresponding to the determined vehicle state from the preset table.

Referring to the table of FIG. 16 indicating the relationship between the vehicle state and damping torque index, a damping torque index Kc is set corresponding to each of a plurality of vehicle states. For example, damping torque index Kc is set to "0" when the vehicle is in an extremely low speed mode. When the vehicle corresponds to a speed other than the extremely low speed, i.e. when in a low/middle vehicle speed or high vehicle speed mode, damping torque index Kc is set to "1".

As another example, damping torque index Kc is set to "2" when the engine is in an engine startup mode or in an engine stop mode. Additionally, when target drive torque Tbt suddenly changes or when the accelerator press-down amount suddenly changes, damping torque index Kc is set to "3".

The set states of the vehicle are not limited thereto. For example, damping torque index Kc corresponding to the state of the running road of the vehicle (road roughness information) obtained from a navigation device or the like can be set to "4" when the roughness of the road is relatively great.

Damping torque index determination unit 503 selects a damping torque index Kc corresponding to the vehicle state determined based on various input signals from the table of FIG. 16, and provides the selected damping torque index Kc to damping torque setting unit 50A. Upon receiving selected damping torque index Kc, damping torque setting unit 50A inserts damping torque index Kc to equation (2) set forth above to calculate damping torque Tcct.

FIG. 17 is a diagram representing the relationship between damping torque index Kc and damping torque Tcct.

Referring to FIG. 17, damping torque Tcct calculated based on damping torque index Kc indicates a different value for each damping torque index Kc. In other words, damping torque Tcct takes a variable value set to a different value corresponding to the vehicle state.

In the context that damping torque Tcct takes a variable value corresponding to the vehicle state, the motor drive device according to the fourth embodiment of the present invention differs from the motor drive device of the first embodiment that has damping torque Tcct fixed to damping torque upper limit value Tc_max.

Figure 18:
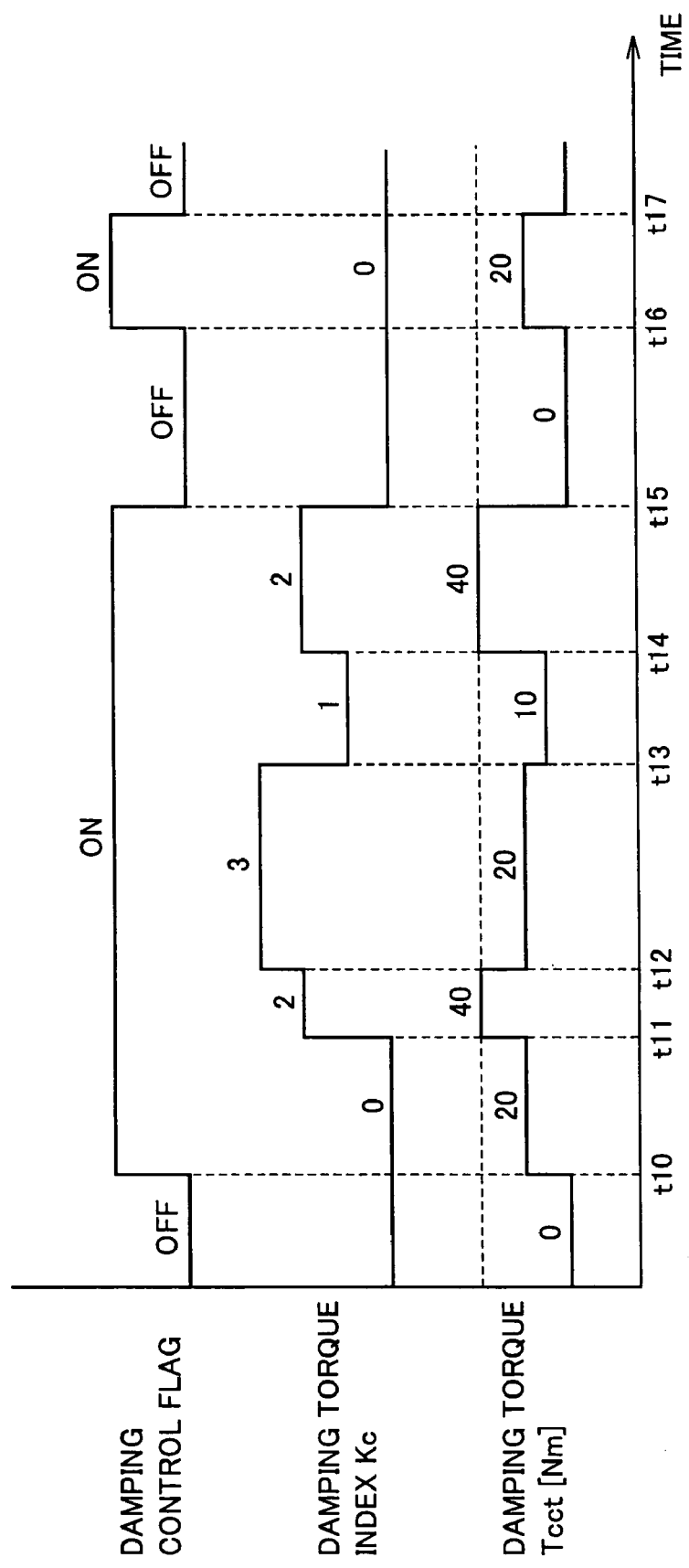
FIG. 18 is a timing chart of a damping control flag, damping torque index, and damping torque.

FIG. 18 is a timing chart of the damping control flag, damping torque index Kc and damping torque Tcct generated based on FIGS. 16 and 17.

It is appreciated from FIG. 18 that damping torque Tcct is highest when the vehicle is in the engine startup mode/engine stop mode (damping torque index Kc="2"), next highest when the vehicle is in an extremely low speed mode (Kc="0") or when in a sudden change mode of the target drive torque and accelerator press-down amount (Kc="3"), and lowest when the vehicle is in a low/middle speed mode or high speed mode (Kc="1").

Accordingly, damping torque Tcct is set at the highest value in an engine startup mode/engine stop mode in which the pulsation of the drive torque is relatively large reflecting the change in motor revolution count Nm caused by the sudden change in engine speed. Further, damping torque Tcct is set to the next highest value when in an extremely low speed mode in which waviness occurs in motor revolution count Nm or in an acceleration mode in which the target drive torque or accelerator press-down amount suddenly changes although the torque pulsation is lower than that in an engine startup mode/engine stop mode. When running steadily such as in a low/middle speed mode or high speed mode in which torque pulsation is relatively low, damping torque Tcct is set to the lowest value.

According to the present embodiment, sufficient damping torque required for execution of damping control can be set appropriately according to the vehicle state. This can prevent the event of a uselessly high voltage command Vht caused by damping torque Tcct being set to a higher level than required, as compared to the case where damping torque Tcct is uniformly fixed to damping torque upper limit value Tc_max. Therefore, power loss of voltage-up converter 12 and motor loss can be reduced without deteriorating the riding comfort of the vehicle. As a result, improvement of vehicle fuel efficiency can be realized.

Figure 19:
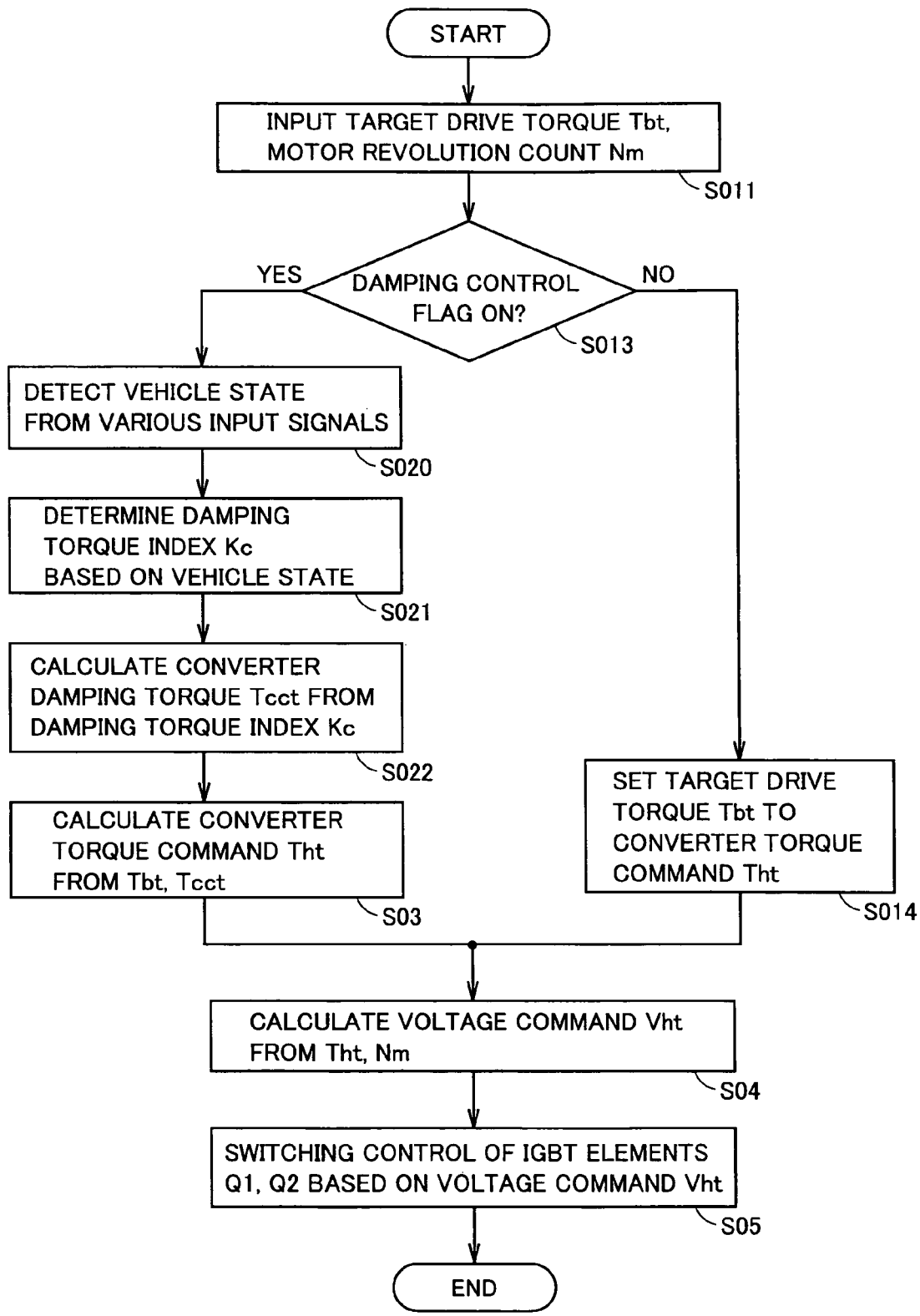
FIG. 19 is a flow chart to describe voltage conversion control according to the fourth embodiment of the present invention.

FIG. 19 is a flow chart to describe voltage conversion control according to the fourth embodiment of the present invention.

Referring to FIG. 19, when drive control of AC motor M1 is initiated, target drive torque Tbt of AC motor M1 is calculated according to an accelerator pedal operation or the like by the driver. The calculated target drive torque Tbt is applied together with motor revolution count Nm to inverter control circuit 301 and converter control circuit 302 (step S011).

Converter control circuit 302 first determines the effectiveness/ineffectiveness of damping control based on target drive torque Tbt and motor revolution count Nm. The damping control flag is set to an on state or an off state according to the determination result.

Damping torque index determination unit 503 determines whether the damping control flag is ON or not (step S013). When determination is made that the damping control flag is ON at step S013, i.e. determination is made that damping control is effective, damping torque index determination unit 503 determines the vehicle state based on various input signals (step S020). Then, damping torque index Kc corresponding to the determined vehicle state is selected from the table of FIG. 16 to determine damping torque index Kc (step S021).

The determined damping torque index Kc is output to damping torque setting unit 501A.

Damping torque setting unit 501A calculates damping torque Tcct based on damping torque index Kc (step S022). The calculated damping torque Tcct is added with target drive torque Tbt from external ECU to be set as torque command Tht (step S03).

When determination is made that the damping control flag is OFF at step S013, i.e. determination is made that damping control is ineffective, converter damping torque setting unit 501 directly sets target drive torque Tbt as torque command Tht (step S014). Torque command Tht set at each of steps S03 and S014 is provided to voltage command calculation unit 52.

Voltage command calculation unit 52 calculates voltage command Vht based on torque command Tht and motor revolution count Nm from external ECU (step S04). Then, the switching of IGBT elements Q1 and Q2 of voltage-up converter 12 is controlled based on the calculated voltage command Vht (step S05). Motor drive voltage Vh sufficient to output torque specified by torque command Tcmd is applied stably to inverter 14.

[First Modification]

When damping torque Tcct is altered according to the vehicle state, damping torque Tcct varies in a stepped manner according to the switching of damping torque index Kc, as described with reference to FIG. 18. Since torque command Tht also varies in a stepped manner correspondingly, voltage command Vht calculated based on torque command Vht will change in a stepped manner.

For example, when damping torque Tcct is increased in a stepped manner from 20 Nm to 40 Nm, voltage command Vht also increases abruptly in an stepped manner. In view of this increase, the switching of IGBT elements Q1 and Q2 is controlled such that a voltage-up operation is conducted according to the increase in voltage command Vht at voltage-up converter 12. In this case, the voltage-up operation is carried out with a predetermined time constant originating from the charging speed and the like of capacitor C2 arranged at the output side. Therefore, it will be difficult to set output voltage Vh of voltage-up converter 12 so as to follow the abrupt increase in voltage command Vht. When output voltage Vh does not meet voltage command Vht, there is a problem that AC motor M1 cannot output torque specified by torque command Tht.

Figure 20:
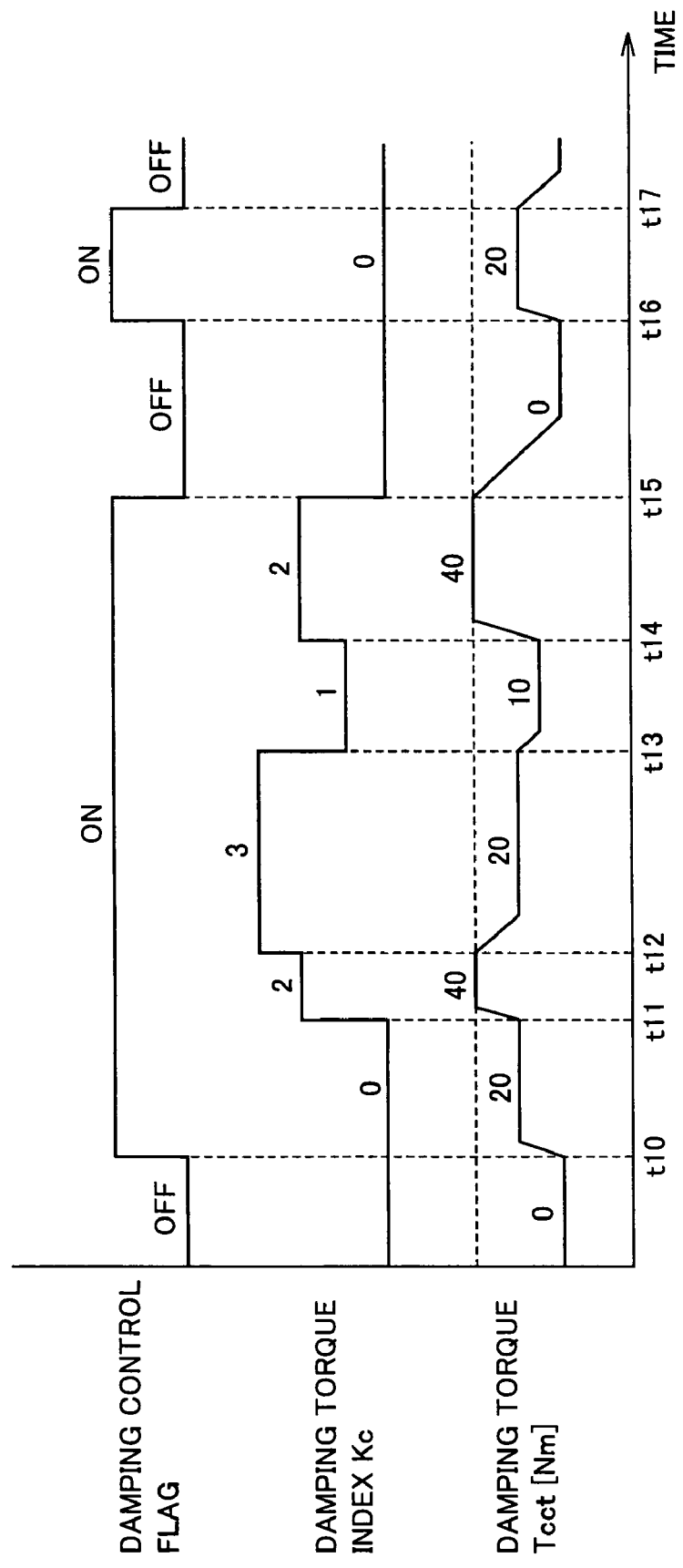
FIG. 20 is a timing chart of a damping control flag, damping torque index, and damping torque.

In view of the foregoing, the present modification has the rate of change set to avoid exceeding the time constant in the voltage-up operation of voltage-up converter 12 when damping torque Tcct increases, as shown in FIG. 20. Accordingly, unstable damping control caused by insufficient torque can be prevented.

When damping torque Tcct decreases in a stepped manner from 40 Nm to 20 Nm, for example, voltage command Vht will also decrease abruptly in a stepped manner. Therefore, switching of IGBT elements Q1 and Q2 is controlled so as to conduct a voltage-down operation according to the decrease in voltage command Vht at voltage-up converter 12. The voltage-down operation at this stage is carried out with a predetermined time constant, similar to the voltage-up operation set forth above.

Even if output voltage Vh of voltage-up converter 12 cannot follow the abrupt decrease in voltage command Vht such that output voltage Vh exceeds voltage command Vht, the problem of insufficient torque will not occur since motor drive voltage of a level sufficient for output of the motor torque specified by torque command Tht is applied to inverter 14, unlike the voltage-up operation set forth above.

When damping torque Tcct is decreased instantaneously to 0 Nm at the time of switching from execution to suspension of damping control, the output torque of AC motor M1 varies corresponding to the variation in the damping torque. Such a variation will correspond to discontinuity in the output torque, leading to vibration at the vehicle.

In view of the foregoing, the present first modification is directed to setting the rate of change when damping torque Tcct decreases to a relatively low value with respect to the rate of change when damping torque Tcct increases, taking into consideration vehicle vibration due to a sudden change in the output torque, to decrease the output torque gently, as shown in FIG. 20. In practice, such adjustment in the rate of change of damping torque Tcct is executed by converter damping torque setting unit 50A shown in FIG. 15.

[Second Modification]

In damping control of AC motor M1, the deviation ΔNm between the actual motor revolution count Nm and the target revolution count of AC motor M1 is obtained, and feedback control of AC motor M1 is conducted such that deviation ΔNm becomes zero. In feedback control, PI (proportional integral) control is conducted based on the deviation ΔNm between motor revolution count Nm and the target revolution count to set damping torque Tcct as shown in equation (3) set forth below:

$$Tcct = Kp \cdot \Delta Nm + Ki \cdot \Delta Nm \quad (3)$$

where Kp is the P gain and Ki is the I gain.

During execution of damping control, i.e. when the damping control flag is ON, a predetermined feedback gain coefficient Kfb is multiplied by the PI control gain (P gain Kp, I gain Ki) to increase or decrease the Pi control gain.

Figure 21:
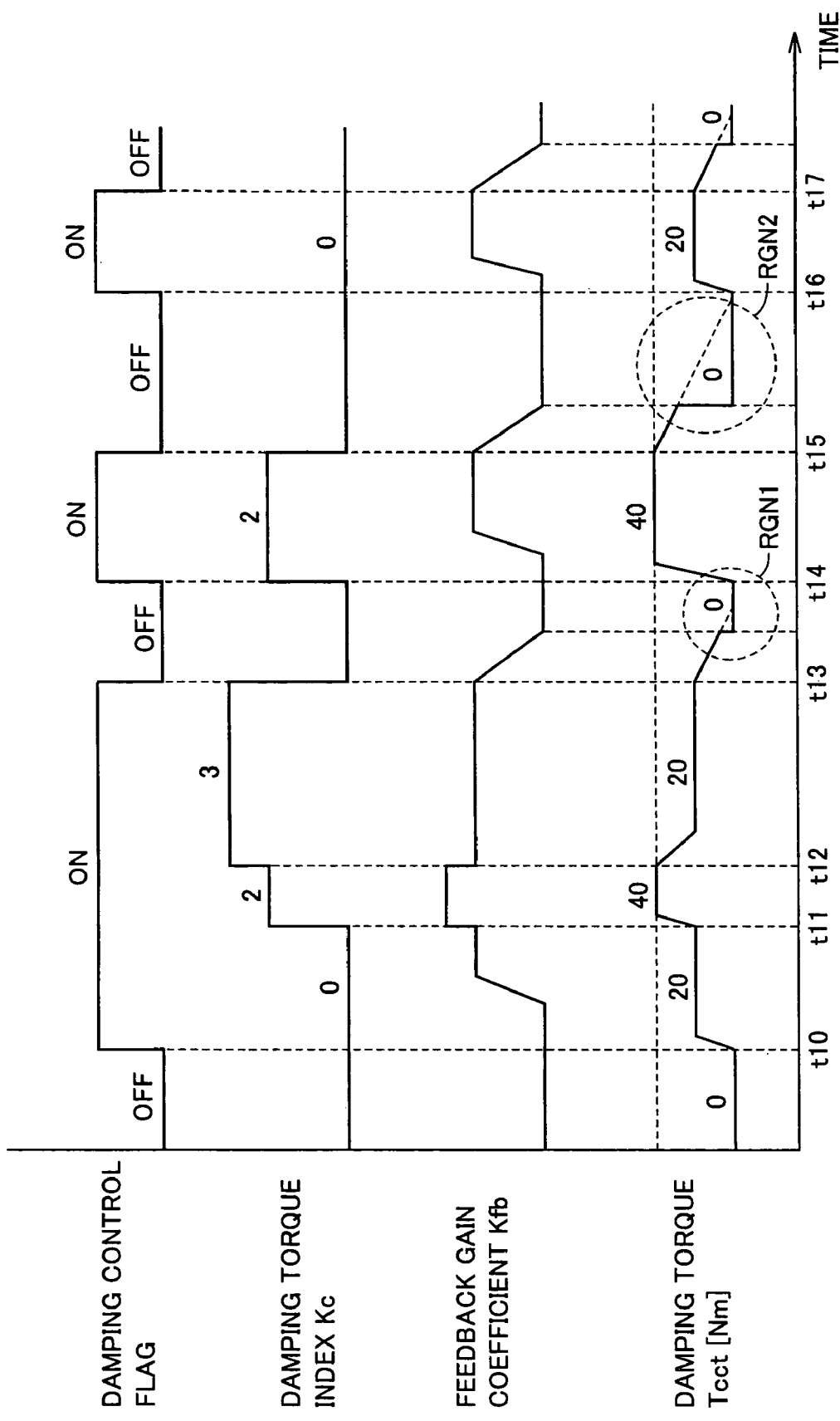
FIG. 21 is a timing chart of a damping control flag, damping torque index, feedback gain coefficient, and damping torque.

FIG. 21 is a timing chart of the damping control flag, damping torque index Kc, feedback gain coefficient Kfb, and damping torque Tcct.

It is appreciated from FIG. 21 that, during execution of damping control, i.e. when the damping control flag is ON, feedback gain coefficient Kfb is set higher corresponding to a vehicle state in which the torque pulsation is greater, likewise damping torque Tcct. This is intended for increasing damping control response.

Feedback gain coefficient Kfb is set to be gradually reduced towards zero to avoid generation of discontinuity in the output torque set forth above when switching from execution to suspension of damping control. In response to feedback gain coefficient Kfb arriving at zero, damping control is substantially suspended.

As described in the previous first modification, damping torque Tcct decreases mildly at a predetermined rate of change when switching from execution to suspension of damping control. At this stage, the predetermined voltage rate is set to become lower than the decreasing rate of the feedback gain coefficient. This is to prevent damping control from being forced to be suspended as a result of damping torque Tcct attaining 0 Nm at a earlier timing than feedback gain coefficient Kfb.

By setting the rate of change of damping torque Tcct as set forth above, there may be the case where damping torque Tcct has not arrived at 0 Nm even in the state where feedback gain coefficient Kfb becomes zero and damping control is substantially suspended, as indicated by regions RGN1 and RGN2 in FIG. 21. In these regions RGN1 and RGN2, voltage command Vht will be increased uselessly since torque command Tht is set high corresponding to damping torque Tcct with respect to target drive torque Tbt even though damping control is suspended. This leads to the possibility of increasing power loss at voltage-up converter 12.

In view of the foregoing, the present modification is directed to forcing damping torque Tcct to 0 Nm in response to feedback gain coefficient Kfb arriving at zero. Accordingly, damping torque Tcct is set to 0 Nm at the timing of damping control being suspended. Therefore, useless boosting is prevented and power loss at voltage-up converter 12 can be further reduced. As a result, further improvement of the fuel efficiency of the vehicle is allowed.

In the timing of initiating execution from suspension of damping control, there is a case where feedback gain coefficient Kfb gradually increases from zero with a constant delay. Considering the possibility of output voltage Vh not being able to follow voltage command Vht by the effect of the time constant of the boosting operation, it is not preferable to set damping torque Tcct to 0 Nm even if feedback gain coefficient Kfb is zero.

Thus, at the time of initiating execution of damping control, damping torque Tcct is to be increased immediately at a rate of change not exceeding the time constant of the boosting operation, as indicated previously in the first modification. In practice, such adjustment in the rate of change of damping torque Tcct is executed by converter damping torque setting unit 50A shown in FIG. 15.

Since damping torque sufficient required for execution of damping control is appropriately set according to the vehicle state in the fourth embodiment of the present invention, useless increase in the voltage command caused by the damping torque being set higher than necessary can be prevented. Therefore, power loss at the voltage-up converter and motor loss can be reduced without degrading the riding comfort of the vehicle, and fuel efficiency of the vehicle can be improved.

By rapidly increasing the damping torque at a rate of change that does not exceed the time constant of the boosting operation of the voltage-up converter, insufficient output torque can be prevented to allow damping control to be carried out stably.

Further, by setting the damping torque to zero at the same timing as the feedback gain coefficient in switching from execution to suspension of damping control, useless boosting can be prevented and power loss at the voltage-up converter can be further reduced. As a result, the fuel efficiency of the vehicle can be further improved.

Industrial Applicability of the Invention

The present invention can be employed in a motor drive device with a damping control function of output torque.

The invention claimed is:

1. A motor drive device comprising:
a drive circuit driving a motor,
a motor drive control circuit controlling said drive circuit such that output torque of said motor follows a first torque command,
a voltage converter for voltage conversion of power from a power source for input to said drive circuit, and
a voltage conversion control circuit controlling said voltage conversion such that an output voltage matches a voltage command,
wherein said motor drive control circuit comprises a first damping control unit setting in advance a setting range with predetermined torque independent of a variation component of a revolution count of said motor as an upper limit value to encompass a variation range of output torque expected when said motor is driven, for damping torque to suppress pulsation of output torque of said motor, and generating said damping torque based on said variation component of said motor revolution count in said setting range, and adding said generated damping torque to target drive torque as said first torque command,
said voltage conversion control circuit determining said voltage command based on a result of adding the upper limit value of said damping torque corresponding to said predetermined torque to said target drive torque.

2. The motor drive device according to claim 1, further comprising a charge storage unit arranged between said voltage converter and said drive circuit for smoothing converted DC current for input to said drive circuit.

3. The motor drive device according to claim 1, wherein said voltage conversion control circuit comprises
a second damping control unit adding the upper limit value of said damping torque to said target drive torque as a second torque command, and
a voltage conversion control unit determining said voltage command according to said second torque command and a revolution count of said motor for controlling said voltage conversion according to said voltage command,
said second damping control unit setting the upper limit value of said damping torque such that the upper limit value of said damping torque becomes lower as the revolution count of said motor becomes higher.

4. The motor drive device according to claim 3, wherein said second damping control unit includes a damping control instruction unit instructing one of execution and suspension of damping control according to a temporal rate of change of said target drive torque and the revolution count of said motor, said target drive torque directly set as said second torque command in response to a suspension instruction of said damping control.

5. The motor drive device according to claim 4, wherein said damping control instruction unit instructs only execution of said damping control when an input/output power limit value of said power source is lower than a predetermined threshold value.

6. The motor drive device according to claim 5, further comprising a power source temperature detection unit detecting a temperature of said power source,
wherein said damping control instruction unit determines that the input/output power limit value of said power source is lower than said predetermined threshold value when said detected temperature of said power source is lower than a predetermined temperature.

7. The motor drive device according to claim 1, wherein said motor drive control circuit sets said predetermined torque larger than half the variation range of output torque expected when said motor is driven.

8. A motor drive device comprising:
a drive circuit driving a motor that generates drive torque of a vehicle,
a motor drive control circuit controlling said drive circuit such that output torque of said motor follows a first torque command,
a voltage converter for voltage conversion of power from a power source for input to said drive circuit, and
a voltage conversion control circuit controlling said voltage conversion such that an output voltage matches a voltage command,
wherein said motor drive control circuit comprises a first damping control unit setting in advance a setting range with predetermined torque independent of a variation component of a revolution count of said motor as an upper limit value to encompass a variation range of output torque expected when said motor is driven, for damping torque to suppress pulsation of output torque of said motor, and generating said damping torque based on said variation component of said motor revolution count in said setting range, and adding said generated damping torque to target drive torque as said first torque command, wherein said voltage conversion control circuit comprises a second damping control unit setting a second torque command that is a result of adding the upper limit value of said damping torque corresponding to said predetermined torque to said target drive torque a voltage conversion control unit determining said voltage command according to said second torque command for controlling said voltage conversion according to said voltage command, said second damping control unit setting the upper limit value of said damping torque variable according to a state of said vehicle.

9. The motor drive device according to claim 8, wherein said second damping control unit sets the upper limit value of said damping torque such that the upper limit value of said damping torque becomes lower as a vehicle speed becomes higher.

10. The motor drive device according to claim 8, wherein said second damping control unit sets the upper limit value of said damping torque variable according to a temporal rate of change of said target drive torque.

11. The motor drive device according to claim 10, wherein said second damping control unit sets the upper limit value of said damping torque such that the upper limit value of said damping torque becomes higher as the temporal rate of change of said target drive torque becomes higher.

12. The motor drive device according to claim 8, said vehicle including an internal combustion engine generating drive torque of said vehicle by a drive source independent of said motor, wherein said second damping control unit sets the upper limit value of said damping torque such that the upper limit value of said damping torque becomes relatively higher when said internal combustion engine is started or stopped.

13. The motor drive device according to claim 8, wherein said second damping control unit increases the upper limit value of said damping torque at a first rate of change set so as to avoid exceeding a time constant of said voltage converter in a damping torque upper limit value increase mode, and decreases the upper limit value of said damping torque at a second rate of change lower than said first rate of change in a damping torque upper limit value decrease mode.

14. The motor drive device according to claim 8, wherein said second damping control unit comprises a damping control instruction unit instructing one of execution and suspension of damping control according to a temporal rate of change of said target drive torque and a revolution count of said motor, a feedback control unit feedback-controlling said second torque command such that a deviation between the revolution count of said motor and a target revolution count becomes zero during execution of said damping control, and a feedback gain adjustment unit adjusting gain multiplied by said deviation in said feedback control according to a state of said vehicle, and gradually decreasing said gain towards substantially zero in response to a suspension instruction of said damping control, wherein the upper limit value of said damping torque is decreased at a rate of change lower than said rate of change of the gain in response to a suspension instruction of said damping control, and sets the upper limit value of said damping torque to substantially zero in response to said gain arriving at substantially zero.

15. A control method of a motor drive device including a drive circuit driving a motor, and a voltage converter for voltage conversion of power from a power source for input to said drive circuit, said method comprising:

a motor drive control step of controlling said drive circuit such that output torque of said motor follows a first torque command, a voltage conversion control step of controlling said voltage conversion such that an output voltage matches a voltage command, wherein said motor drive control step includes a first damping control step of setting in advance a setting range with predetermined torque independent of a variation component of a revolution count of said motor as an upper limit value to encompass a variation range of output torque expected when said motor is driven, for damping torque to suppress pulsation of output torque of said motor, and generating said damping torque based on said variation component of said motor revolution count in said setting range, and adding said generated damping torque to target drive torque as said first torque command, wherein said voltage conversion control step determines said voltage command based on a result of adding the upper limit value of said damping torque corresponding to said predetermined torque to said target drive torque.

16. The control method of a motor drive device according to claim 15, wherein said motor drive device further includes a charge storage unit arranged between said voltage converter and said drive circuit for smoothing converted DC voltage for input to said drive circuit, wherein said voltage conversion control step comprises a second damping control step of adding the upper limit value of said damping torque to said target drive torque as a second torque command, and a voltage conversion control step of determining said voltage command according to said second torque command and a revolution count of said motor for controlling said voltage conversion according to said voltage command, wherein said second damping control step sets an upper limit value of said damping torque such that the upper limit value of said damping torque becomes lower as the revolution count of said motor becomes higher.

17. The control method of a motor drive device according to claim 16, wherein said second damping control step includes a damping control instruction step of instructing one of execution and suspension of damping control according to a temporal rate of change of said target drive torque and the revolution count of said motor, said target drive torque directly set as said second torque command in response to a suspension instruction of said damping control.

18. The control method of a motor drive device according to claim 17, wherein said damping control instruction step instructs only execution of said damping control when an input/output power limit value of said power source is lower than a predetermined threshold value.

19. The control method for a motor drive device according to claim 18, further comprising a power source temperature detection step of detecting a temperature of said power source, wherein said damping control instruction step determines that the input/output power limit value of said power source is lower than said predetermined threshold value when said detected temperature of the power source is lower than a predetermined temperature.

20. The control method of a motor drive device according to claim 15, wherein said motor drive control step sets said predetermined torque larger than half the variation range of output torque expected when said motor is driven.

21. A control method for a motor drive device including a drive circuit driving a motor that generates drive torque of a vehicle, and a voltage converter for voltage conversion of power from a power source for input to said drive circuit, said control method comprising:
  a motor drive control step of controlling said drive circuit such that output torque of said motor follows a first torque command, and
  a voltage conversion control step of controlling said voltage conversion such that an output voltage matches a voltage command,
  wherein said motor drive control step includes a first damping control step of setting in advance a setting range with predetermined torque independent of a variation component of a revolution count of said motor as an upper limit value to encompass a variation range of output torque expected when said motor is driven, for damping torque to suppress pulsation of output torque of said motor, and generating said damping torque based on said variation component of said motor revolution count in said setting range, and adding said generated damping torque to target drive torque as said first torque command,
  said voltage conversion control step including
  a second damping control step of adding the upper limit value of said damping torque corresponding to said predetermined torque to said target drive torque as a second torque command,
  a voltage conversion control step of determining said voltage command according to said second torque command for controlling said voltage conversion according to said voltage command,
  wherein said second damping control step sets the upper limit value of said damping torque variable according to a state of said vehicle.

22. The control method for a motor drive device according to claim 21, wherein said second damping control step sets the upper limit value of said damping torque such that the upper limit value of said damping torque becomes lower as a vehicle speed becomes higher.

23. The control method for a motor drive device according to claim 21, wherein said second damping control step sets the upper limit value of said damping torque variable according to a temporal rate of change of said target drive torque.

24. The control method for a motor drive device according to claim 21, wherein said second damping control step sets the upper limit value of said damping torque such that the upper limit value of said damping torque becomes higher as the temporal rate of change of said target drive torque becomes higher.

25. The control method for a motor drive device according to claim 21, said vehicle including an internal combustion engine generating drive torque of said vehicle by a drive source independent of said motor,
  wherein said second damping control step sets the upper limit value of said damping torque such that the upper limit value of said damping torque becomes relatively higher when said internal combustion engine is started or stopped.

26. The control method for a motor drive device according to claim 21, wherein said second damping control step increases the upper limit value of said damping torque at a first rate of change set so as to avoid exceeding a time constant of said voltage converter in a damping torque upper limit value increase mode, and decreases the upper limit value of said damping torque at a second rate of change lower than said first rate of change in a damping torque upper limit value decrease mode.

27. The control method for a motor drive device according to claim 21, wherein said second damping control step comprises
  a damping control instruction step of instructing one of execution and suspension of damping control according to a temporal rate of change of said target drive torque and a revolution count of said motor,
  a feedback control step of feedback-controlling said second torque value such that a deviation between the revolution count of said motor and a target revolution count becomes zero during execution of said damping control, and
  a feedback gain adjustment step of adjusting gain multiplied by said deviation in said feedback control according to a state of said vehicle, and gradually decreasing said gain towards substantially zero in response to a suspension instruction of said damping control,
  wherein the upper limit value of said damping torque is decreased at a rate of change lower than said rate of change of the gain in response to a suspension instruction of said damping control, and sets the upper limit value of said damping torque to substantially zero in response to said gain arriving at substantially zero.

* * * * *